US012722078B2

(12) United States Patent
Wang et al.

(10) Patent No.: US 12,722,078 B2
(45) Date of Patent: Sep. 1, 2026

(54) VIRTUAL CHARACTER DISPLAY METHOD AND APPARATUS, DEVICE, AND STORAGE MEDIUM

(71) Applicant: Tencent Technology (Shenzhen) Company Limited, Shenzhen (CN)

(72) Inventors: Siyuan Wang, Shenzhen (CN); Teng Chen, Shenzhen (CN); Guanjun Zhang, Shenzhen (CN); Danlong Yao, Shenzhen (CN); Xiaoyu Yu, Shenzhen (CN); Zhao Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 116 days.

(21) Appl. No.: 18/811,461

(22) Filed: Aug. 21, 2024

(65) Prior Publication Data

US 2024/0408488 A1 Dec. 12, 2024

Related U.S. Application Data

(63) Continuation of application No. PCT/CN2023/123243, filed on Oct. 7, 2023.

(30) Foreign Application Priority Data

Dec. 15, 2022 (CN) ......................... 202211613125.2

(51) Int. Cl.
*A63F 13/52* (2014.01)
*G06F 3/0481* (2022.01)
(Continued)

(52) U.S. Cl.
CPC ............ *A63F 13/52* (2014.09); *G06F 3/0481* (2013.01); *G06F 3/04842* (2013.01); *G06Q 10/40* (2026.01)

(58) Field of Classification Search
CPC .... A63F 13/52; G06F 3/0481; G06F 3/04842; G06Q 10/40
See application file for complete search history.

(56) References Cited

U.S. PATENT DOCUMENTS 10,286,301 B1 * 5/2019 Kim ........................ A63F 13/45
10,846,898 B2 * 11/2020 Lee ........................ G06T 11/60
(Continued)

FOREIGN PATENT DOCUMENTS

CN 103150172 A 6/2013
CN 110060678 A 7/2019
(Continued)

OTHER PUBLICATIONS

Tencent Technology, ISR, PCT/CN2023/123243, Dec. 11, 2024, 2 pgs.

(Continued)

*Primary Examiner* — Dmitriy Bolotin
(74) *Attorney, Agent, or Firm* — Morgan, Lewis & Bockius LLP

(57) ABSTRACT

This application discloses a virtual character display method performed by a computer device and relates to the field of application programs supporting virtual worlds. The method includes: displaying a virtual world, the virtual world including at least two scene block buildings, and each of the scene block buildings being configured for displaying virtual characters in activity statuses of a same type; determining a first social status posted by a user of the computer device associated with a first user account of the virtual world; and displaying a first virtual character corresponding to the first user account in a first scene block building corresponding to the first social status, the first virtual character being in an activity status corresponding to the first social status and
(Continued)

having a scene element matching the activity status corresponding to the first scene block building.

20 Claims, 10 Drawing Sheets

(51) Int. Cl.
*G06F 3/04842* (2022.01)
*G06Q 10/40* (2026.01)

(56) References Cited

U.S. PATENT DOCUMENTS

2009/0106672 A1 4/2009 Burstrom
2010/0216553 A1* 8/2010 Chudley ................ A63F 13/54 463/42
2010/0228633 A1* 9/2010 Guimaraes ......... G06Q 30/0273 705/14.69
2015/0264092 A1* 9/2015 Herger .................. G06F 40/169 709/204
2017/0197144 A1* 7/2017 Maa ...................... H04M 1/026
2018/0369693 A1* 12/2018 Rong ...................... A63F 13/92
2021/0097893 A1* 4/2021 Klappert ............. G06F 16/9024
2021/0409535 A1 12/2021 Mourkogiannis et al.
2024/0181349 A1* 6/2024 Lee ......................... A63F 13/35
2025/0032918 A1* 1/2025 Chen ....................... A63F 13/42

FOREIGN PATENT DOCUMENTS

CN 113244616 A 8/2021
CN 114011064 A 2/2022
KR 101319779 B1 10/2013

OTHER PUBLICATIONS

Tencent Technology, Korean Office Action, KR Patent Application No. 10-2025-7017714, May 27, 2026, 26 pgs.

* cited by examiner

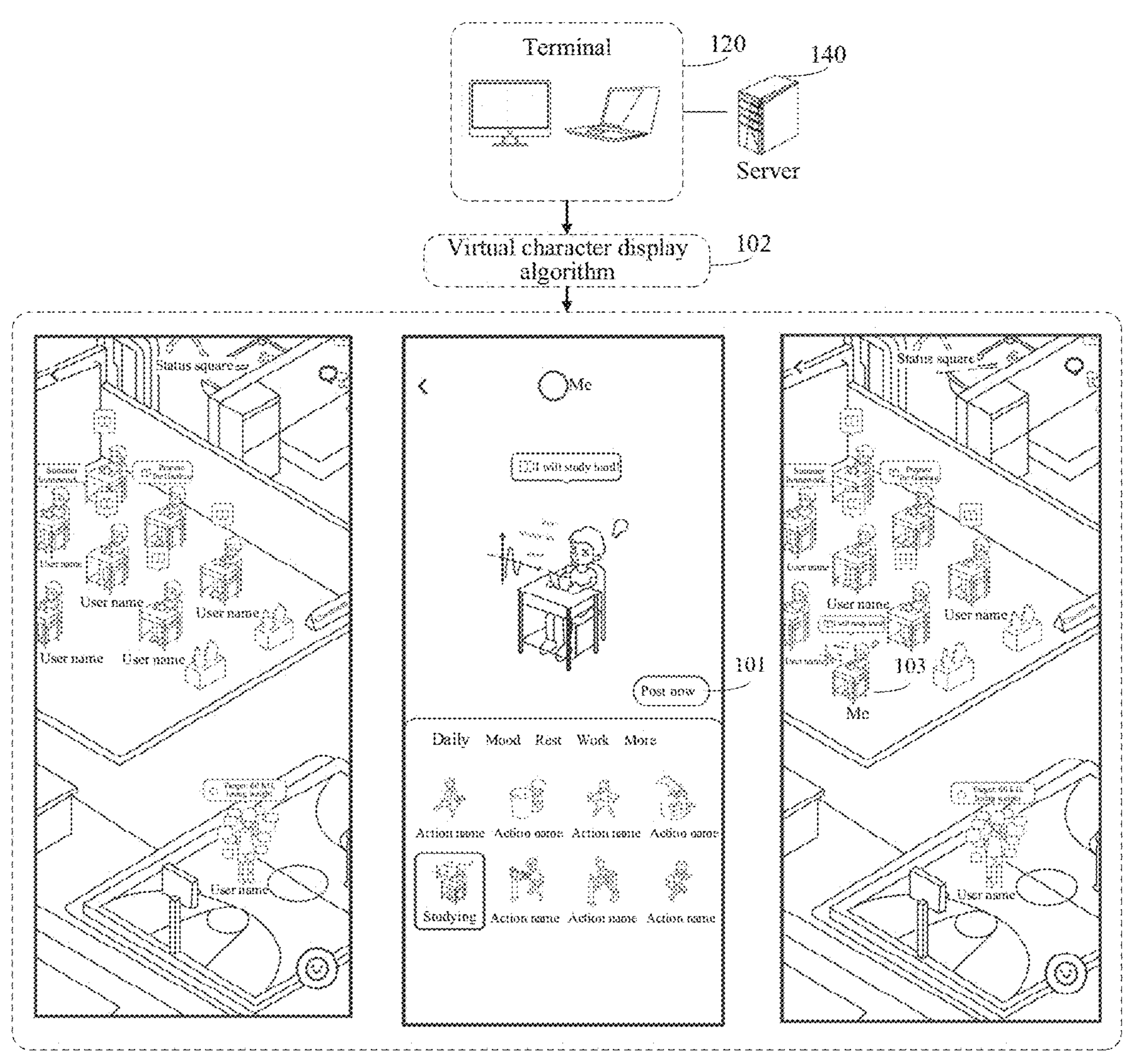

FIG. 1

210 Display a virtual world, the virtual world including at least two scene block buildings, and each of the scene block buildings being configured for displaying virtual characters in activity statuses of a same type 220 Determine a first social status posted by a first user account 230 Display a first virtual character corresponding to the first user account in a first scene block building corresponding to the first social status, the first virtual character being in an activity status corresponding to the first social status, and the first scene block building being one of the at least two scene block buildings

FIG. 2

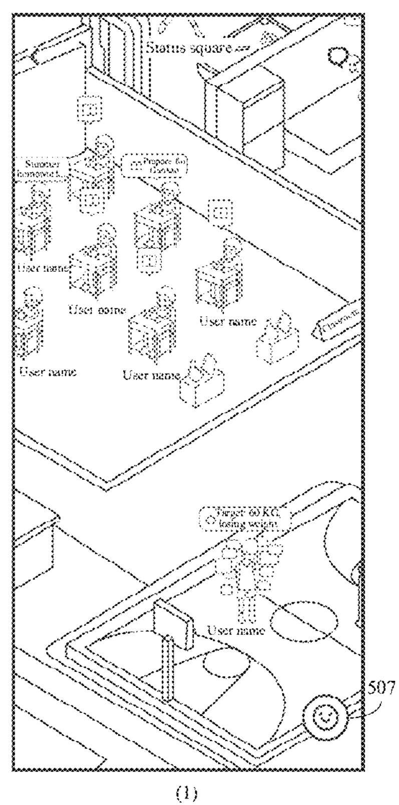
(1)
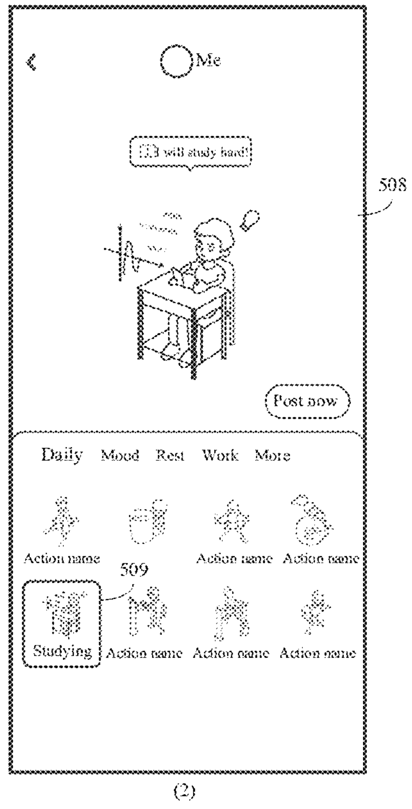
(2)
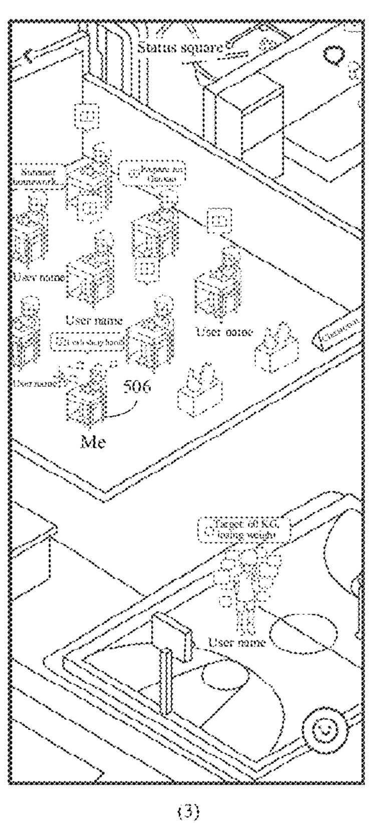
(3)
FIG. 6

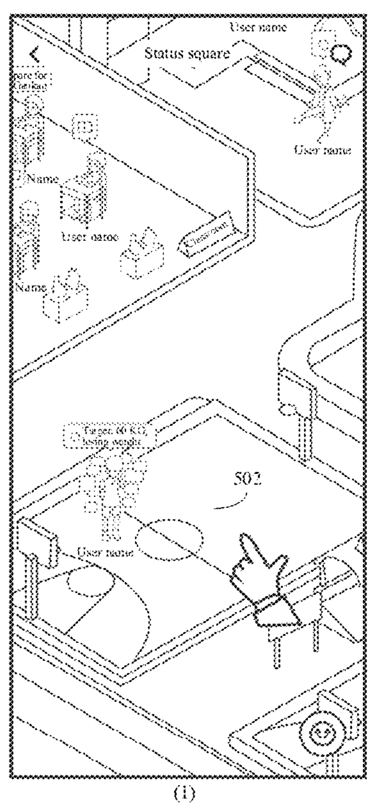
(1)
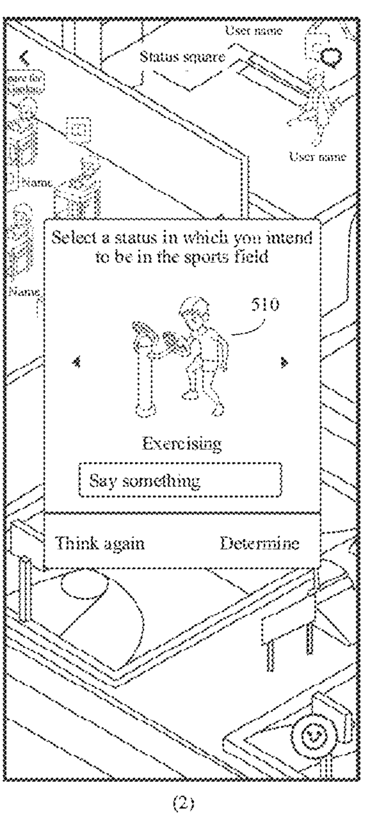
(2)
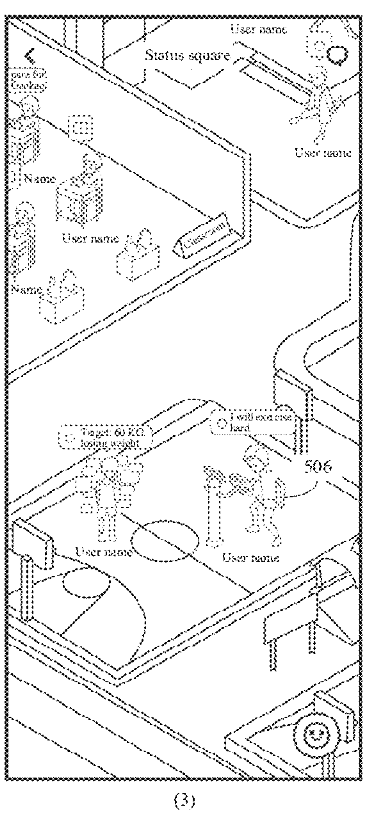
(3)
FIG. 7

VIRTUAL CHARACTER DISPLAY METHOD AND APPARATUS, DEVICE, AND STORAGE MEDIUM

CROSS-REFERENCE TO RELATED APPLICATIONS

This application is a continuation application of PCT Patent Application No. PCT/CN2023/123243, entitled "VIRTUAL CHARACTER DISPLAY METHOD AND APPARATUS, DEVICE, AND STORAGE MEDIUM" filed on Oct. 7, 2023, which claims priority to Chinese Patent Application No. 202211613125.2, entitled "VIRTUAL CHARACTER DISPLAY METHOD AND APPARATUS, DEVICE, AND STORAGE MEDIUM" filed on Dec. 15, 2022, both of which are incorporated herein by reference in their entirety.

FIELD OF THE TECHNOLOGY

This application relates to the field of application programs supporting virtual worlds, and in particular, to a virtual character display method and apparatus, a device, and a storage medium.

BACKGROUND OF THE DISCLOSURE

In a virtual world-based social application program, a user can set a social status of a virtual character, for example, studying, exercising, or being in a daze. When the virtual character is displayed in a virtual world, the social application program causes the virtual character to perform an action corresponding to the social status. For example, the virtual character in the studying state is displayed as performing an action of turning pages of a book.

In the related art, after the user sets the social status of the virtual character, the social application program causes the virtual character to perform the action corresponding to the social status while staying where it is.

According to the method in the related art, when the virtual character performs the action corresponding to the social status in the virtual world while staying where it is, disharmony may arise between the virtual character and the displayed virtual world. As a result, the presented picture is not logical in the real world.

SUMMARY

Embodiments of this application provide a virtual character display method and apparatus, a device, and a storage medium, which can associate a social status of a virtual character with a scene in a virtual world, so that the displayed virtual character has a sense of belonging. Technical solutions are as follows:

According to an aspect of this application, a virtual character display method is performed by a computer device. The method includes:

- determining a first social status posted by a user of the computer device associated with a first user account of the virtual world;
- determining a first social status posted by a first user account; and
- displaying a first virtual character corresponding to the first user account in a first scene block building corresponding to the first social status, the first virtual character being in an activity status corresponding to the first social status and having a scene element matching the activity status corresponding to the first scene block building.

According to another aspect of this application, a computer device is provided. The computer device includes a processor and a memory, the memory having at least one program stored therein, the at least one program being loaded and executed by the processor and causing the computer device to implement the virtual character display method according to the descriptions in the foregoing aspect.

According to another aspect of this application, a non-transitory computer-readable storage medium is provided. The computer-readable storage medium has at least one program stored therein, the at least one program being loaded and executed by a processor of a computer device and causing the computer device to implement the virtual character display method according to the descriptions in the foregoing aspect.

The technical solutions provided in the embodiments of this application include at least the following beneficial effects:

A plurality of scene block buildings are arranged in a virtual world, so that virtual characters in different social statuses can be placed in different scene block buildings. For example, a virtual character that is exercising is placed in a stadium, a virtual character that is walking is placed in a park, and a virtual character that is studying is placed in a library. Then, the virtual characters may be displayed in the different scene block buildings according to the social statuses of the virtual characters. When the virtual character is displayed according to an activity status corresponding to the social status, the displayed virtual character can match the scene block building, to avoid disharmony between the displayed virtual character and a location of the displayed virtual character in the virtual world, and ensure that a picture presented to a user is always logical in the real world. After the virtual character changes the social status of the virtual character, the virtual character can enter a preplanned scene. In this way, an association can be established between the virtual character and the scene, so that the virtual character has a sense of belonging, and the user also has power to set the status. In addition, strangers in the same social status may be displayed in the corresponding scene block building, thereby improving a social success rate.

BRIEF DESCRIPTION OF THE DRAWINGS

FIG. 1 is a block diagram of a computer system according to an exemplary embodiment of this application.

FIG. 2 is a method flowchart of a virtual character display method according to an exemplary embodiment of this application.

FIG. 6 is a schematic diagram of a virtual character display method according to an exemplary embodiment of this application.

FIG. 7 is a schematic diagram of a virtual character display method according to another exemplary embodiment of this application.

DESCRIPTION OF EMBODIMENTS

Figure 3:
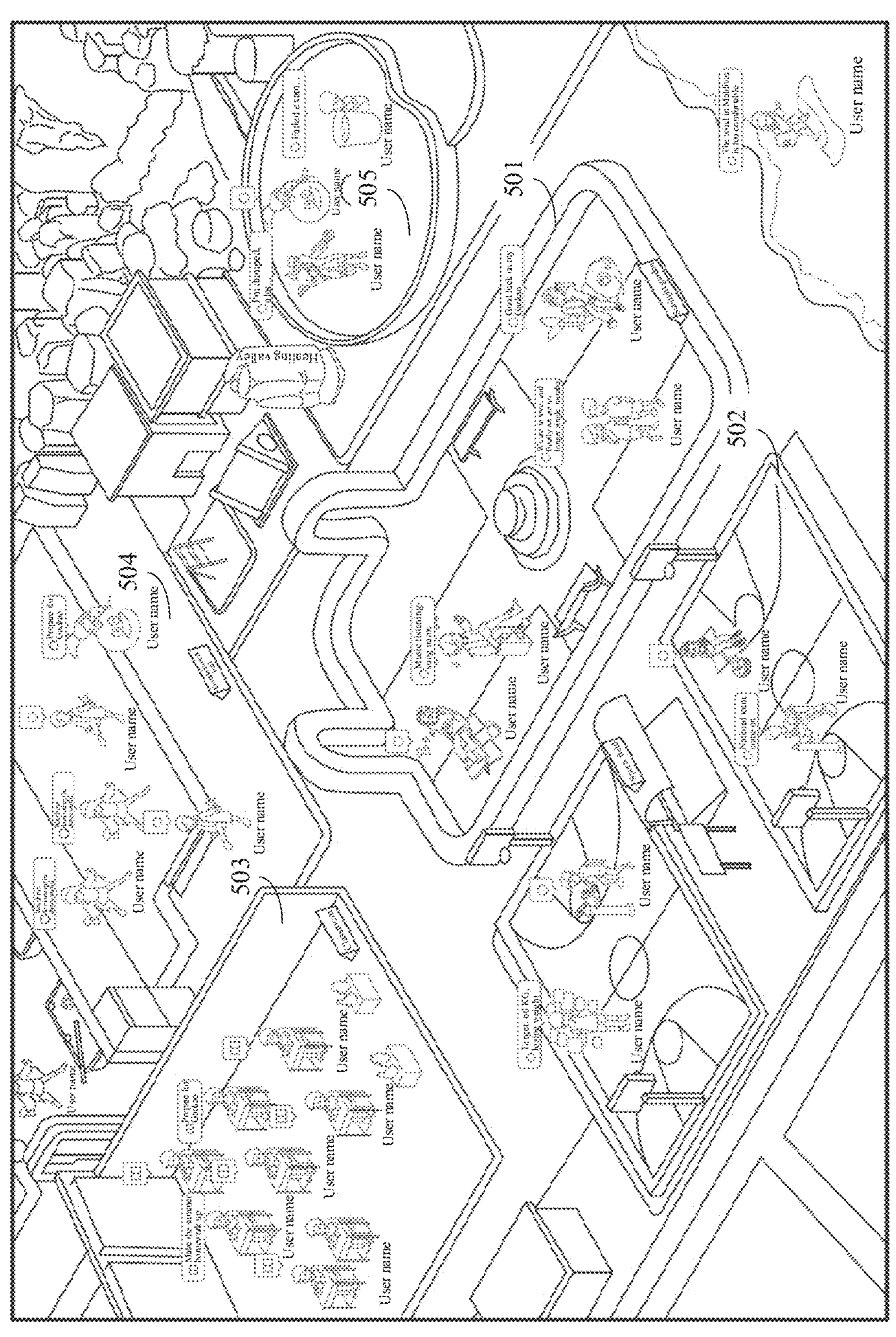
FIG. 3 is a schematic diagram of a virtual world according to an exemplary embodiment of this application.

First, terms involved in embodiments of this application are introduced as follows:

Virtual world: The virtual world is formed by one or more virtual environments. A virtual environment is a virtual environment displayed (or provided) by an application program when run on a terminal. The virtual environment may be a simulated environment of a real world, or may be a semi-simulated and semi-fictional environment, or may be a completely fictional environment. The virtual environment may be any one of a two-dimensional virtual environment, a 2.5-dimensional virtual environment, or a three-dimensional virtual environment. This is not limited in this application.

Virtual character: The virtual character is a movable object in a virtual environment. The movable object may be a virtual human, a virtual animal, a cartoon human, or the like, for example, a human displayed in a three-dimensional virtual environment. In one embodiment, the virtual character is a three-dimensional model created based on a skeletal animation technology. Each virtual character has its own shape and volume in a three-dimensional virtual world, and occupies some space in the three-dimensional virtual world.

Activity status: An activity status of a virtual character is configured for reflecting an action status of the virtual character or an interaction status of the virtual character when the virtual character is displayed. The activity status may reflect a social status of a user account. For example, when a user account is in a studying state (social status), a virtual character of the user account is displayed in the studying state (action status), and the virtual character displayed in the studying state may sit at a desk in a classroom and hold a book in a hand to perform a reading action. In one embodiment, there may be interaction (an interaction status) between the activity status of the virtual character and a building displayed in a scene block building of a virtual world. For example, a virtual character displayed in a basketball playing state in a sports field may be displayed as: aiming at a basketball rim in the sports field to perform a shooting action; or a virtual character displayed in a resting state in a garden may be displayed as: sitting on a bench in the garden.

Social status: The social status is a status of a user account/user. The social status may be determined by setting, a posted update, application data provided by another application program, sport data provided by a wearable device, and the like. The social status is configured for representing an actual state of the user, or a state in which the user subjectively intends to be. However, an activity status is a state presented by a virtual character displayed in a virtual world. The activity status is determined according to a social status, and is configured for presenting, by the virtual character, the social status of the user account in the virtual world in a form of a picture. One social status corresponds to at least one activity status. For example, for a user account in an exercising state, a virtual character of the user account may be displayed in a different exercising stats (a dumbbell raising state, a horse step squatting state, or the like). Alternatively, one social status corresponds to one activity status, and for user accounts in a same social status, virtual characters in the virtual world are displayed in a same scene block building and are displayed in a same activity status. When a user is supported in setting a look of a virtual character and different virtual characters have different looks, displaying the virtual characters in the same activity status means that actions of the displayed virtual characters are the same.

FIG. 1 is a schematic diagram of a computer system according to an exemplary embodiment of this application. The computer system includes a terminal 120 and a server 140.

The terminal 120 may include at least one of a smartphone, a notebook computer, a desktop computer, a tablet computer, or a smart robot. In an exemplary implementation, the virtual character display method provided in this application may be applied to a virtual world-based social application program. The virtual world-based social application program supports a social status setting function. The application program may be an instant messaging program, a social application program, a browser application program, a live streaming application program, a video playing program, a short video playing program, an information program, a knowledge-type program, a life-type program, a shopping-type program, a picture sharing program, a community program, a forum application program, an office application program, or the like. In one embodiment, a client of an application program is installed on the terminal 120.

For example, the terminal 120 stores a virtual character display algorithm 102. When the client needs to use the social status setting function, the client may invoke the virtual character display algorithm to complete display of the virtual character.

For example, when the virtual world-based social application program is run, the terminal 120 displays a picture of the virtual world. For example, in response to an operation 101 by a user posting a social status, a virtual character 103 is displayed in a scene corresponding to the social status according to the social status.

The terminal 120 includes a first memory and a first processor. The first memory stores the virtual character display algorithm. The foregoing virtual character display algorithm is invoked and executed by the first processor to implement the virtual character display method provided in this application. The first memory may be, but is not limited to the following: a random access memory (RAM), a read only memory (ROM), a programmable read-only memory (PROM), an erasable programmable read-only memory (EPROM), and an electrically erasable programmable read-only memory (EEPROM).

The first processor may be formed by one or more integrated circuit chips. In one embodiment, the first processor may be a general purpose processor, for example, a central processing unit (CPU), or a network processor (NP). In one embodiment, the first processor may implement, by running a program or code, the virtual character display method provided in this application.

The terminal 120 and the server 140 is connected to each other by a wired or wireless network.

The server 140 is configured to provide a back-end service to a client of an application program in the terminal 120. For example, the server 140 may be a back-end server 140 of the application program. The server 140 may be one server 140, a cluster of servers 140 formed by a plurality of servers 140, or a cloud computing service center.

For example, the server 140 includes a processor and a memory, where the memory further includes an access module and an information stream pushing module. The server 140 is configured to provide a back-end service to the virtual world-based social application program. In one embodiment, the server 140 is responsible for primary computing work, and the terminal 120 is responsible for secondary computing work; or the server 140 is responsible for secondary computing work, and the terminal 120 is responsible for primary computing work; or the server 140 and the terminal 120 perform collaborative computing by using a distributed computing architecture between each other.

The server 140 includes a second memory and a second processor. The second memory stores the virtual character display algorithm. The foregoing virtual character display algorithm is invoked by the second processor to implement the virtual character display method provided in this application. In one embodiment, the second memory may include, but is not limited to the following: a RAM, a ROM, a PROM, an EPROM, and an EEPROM. In one embodiment, the second processor may be a general-purpose processor, for example, a CPU or an NP.

FIG. 2 is a flowchart of a virtual character display method according to an exemplary embodiment of this application. The method may be performed by a computer device or a client in the computer device, for example, the terminal or the client in the terminal shown in FIG. 1. The method includes the following operations.

Operation 210: Display a virtual world, the virtual world including at least two scene block buildings, and each of the scene block buildings being configured for displaying virtual characters in activity statuses of a same type.

The virtual world is displayed as a two-dimensional world, a 2.5-dimensional world, or a three-dimensional world. The virtual world includes at least two scene block buildings.

In one embodiment, the virtual world is displayed as a big map obtained by splicing the at least two scene block buildings. For example, the virtual world includes the at least two scene block buildings and a road configured for connecting the at least two scene block buildings. The at least two scene block buildings are neatly or irregularly arranged in the virtual world. For example, edge lines of the at least two scene block buildings are parallel to each other. For example, as shown in FIG. 3, the virtual world includes a plurality of scene block buildings such as a sunlight garden 501, a sports field 502, a classroom 503, an entertainment hall 504, and a healing valley 505. In this case, a range of the virtual world is large; and when a display screen of the terminal is small, the entire virtual world cannot be displayed on the display screen at the same time. Therefore, a part of a region of the big map is displayed in a picture of the virtual world, where the part of the region may include one or more scene block buildings.

Alternatively, the virtual world includes the at least two scene block buildings, but only one scene block building can be displayed in a picture. A user may switch to display different scene block buildings, but two scene block buildings are not displayed in the picture at the same time. For example, the user may tap on a map to enter a scene block building, and display a picture of the scene block building. Alternatively, the user may control a virtual character to move to a transmission point in one scene block building, to transmit the virtual character to another scene block building, to display the another scene block building.

In one embodiment, the virtual world is provided by a virtual world-based social application program, and the terminal runs the virtual world-based social application program to display the virtual world. Each user account corresponds to a virtual character in the virtual world, and the user controls the virtual character to move in the virtual world. For example, the virtual world is common to various user accounts, and the various user accounts perform activities in the same virtual world. For example, when the user controls a first virtual character to move in the virtual world, other virtual characters controlled by other user accounts are also displayed in the virtual world. Certainly, to avoid excessive virtual characters being displayed in the virtual world, virtual characters of user accounts of a same type may also be displayed in one virtual world. For example, virtual characters logged in to at a same geographic location are displayed in a same virtual world, or virtual characters registered in a same virtual region are displayed in a same virtual world.

In the virtual world, the user may see the first virtual character controlled by the user and other virtual characters controlled by other users. The user may control the first virtual character to perform interaction or communicate with another virtual character in the virtual world, to achieve a social need of the user.

In the virtual world, the user may control the virtual character to move. In this way, the user can arbitrarily move the virtual character to any location in any scene block building.

Alternatively, to make locations of virtual characters displayed in the virtual world more regular (to avoid one virtual character blocking another virtual character to clutter up a picture), the user may not be allowed to control the virtual character to move in the virtual world. A location of the virtual character in a scene block building is determined by a server. Unless a social status of the virtual character is changed, the location of the virtual character is not changed. In other words, a location of a virtual character in the virtual world only depends on a social status of the virtual character, and the server places virtual characters in a same social status in a same scene block building, to facilitate communication and interaction between the virtual characters in the same social status.

In some embodiments, the scene block building is configured for simulating a building in a real world, or is a semi-fictional and semi-simulated building, or is a completely fictional building. The scene block building is an enclosed building, or an open building, or a semi-enclosed and semi-open building. A scene element is displayed in the scene block building, and the scene element matches the activity status corresponding to the scene block building. The scene element is a display element displayed in the scene block building. In some embodiments, a scene element is configured for indicating a use of a scene block building, or different scene elements are used to distinguish different scene block buildings. In one embodiment, that the scene element matches the activity status includes that a scene reflected by the scene element is consistent with a scene required for displaying the activity status of the virtual character. For example, a scene block building is a classroom, and scene elements in the scene block building include a blackboard, a desk, a platform, and the like. A scene reflected by the scene elements is a scene for studying. The scene is consistent with a scene required by a virtual character in an activity status such as a book reading state. For descriptions of activity statuses, refer to the following descriptions. Details are not described herein first.

The scene block building includes a region and a building displayed in the region. In one embodiment, the scene block building is displayed with a clear region boundary line, or a region occupied by the scene block building is displayed differently from other regions in the virtual world. In other words, in the virtual world, scene block buildings block by block can be clearly seen.

The building displayed in the region is a building related to a scene corresponding to the scene block building. For example, when the scene block building is a classroom, the building displayed in the region may include a blackboard, a desk, and the like. When the scene block building is a sports field, the building displayed in the region may include a basketball stand, a football field, and the like. When the scene block building is a park, the building displayed in the region may include a greenout, a bench, and the like.

One scene block building corresponds to at least one social status, and virtual characters located in the scene block building are all in an activity status corresponding to the at least one social status. For example, virtual characters located in a classroom may be in a studying state, a reading state, a self-studying state, and the like; virtual characters located in a sports field may be in an exercising state, a running state, a basketball playing state, and the like; or virtual characters located in an entertainment hall may be in a singing state, a gaming state, a dancing state, and the like.

In one embodiment, the virtual world is a big map obtained by splicing a plurality of scene block buildings. The virtual world-based social application program may provide the plurality of scene block buildings for the user to select. The user may select at least two scene block buildings according to a preference of the user, and place and splice the at least two scene block buildings, to obtain a virtual world unique to the user account. Unique to the user account means that a scene block building type and a placement location in the virtual world are unique to the user account. The scene block building in the virtual world is still shared by all user accounts. For example, the virtual world-based social application program provides a first scene block building, a second scene block building, and a third scene block building. A first user account may select the first scene block building and the second scene block building, and place the first scene block building and the second scene block building in parallel to obtain a virtual world of the first user account. In this case, the virtual world displayed on a client corresponding to the first user account includes the first scene block building and the second scene block building. Certainly, in the virtual world, other virtual characters located in the first scene block building and the second scene block building are also displayed, but the third scene block building and other virtual characters in the third scene block building are not displayed. In this way, the user can edit a scene block building that the user intends to see according to the preference of the user.

When the virtual world is obtained through edition by the user, if a scene block building corresponding to a social status set by the user for the first user account does not exist in a current virtual world, the scene block building corresponding to the social status may be automatically added and displayed in the current virtual world after the first user account updates the social status. A display location of the scene block building may be determined by the client or the server, and the user may also change the location of the scene block building in the virtual world through a subsequent operation.

Certainly, the scene block building displayed in the virtual world may also be fixed and cannot be manually adjusted by the user.

An activity status of a virtual character is an action status displayed by the virtual character or an interaction status displayed by the virtual character. The activity status may reflect a social status of a user account. For example, when a user account is in a studying state, a virtual character is displayed in the studying state, and the virtual character displayed in the studying state may sit at a desk in a classroom and hold a book in a hand to perform a reading action. In one embodiment, there may be interaction (an interaction status) between the activity status of the virtual character and the building displayed in the scene block building. For example, a virtual character displayed in a basketball playing state in a sports field may be displayed as: aiming at a basketball rim in the sports field to perform a shooting action; or a virtual character displayed in a resting state in a garden may be displayed as: sitting on a bench in the garden.

A social status is a status of a user account/user. The social status may be determined by setting, a posted update, application data provided by another application program, sport data provided by a wearable device, and the like. The social status is configured for representing an actual state of the user, or a state in which the user subjectively intends to be.

However, an activity status is a display state of a virtual character displayed in a virtual world. The activity status is determined according to a social status, and is configured for presenting, by the virtual character, the social status of the user account in the virtual world in a form of a picture.

One social status corresponds to at least one activity status. For example, for a user account in an exercising state, a virtual character may be displayed in a different exercising state (a dumbbell raising state, a horse step squatting state, or the like). Alternatively, one social status corresponds to one activity status, and for user accounts in a same social status, virtual characters in the virtual world are displayed in a same scene block building and are displayed in a same activity status. Because the user may set a look of the virtual character, and different virtual characters have different looks, displaying the virtual characters in the same activity status means that actions of the virtual characters are the same (where looks may be different).

Operation 220: Determine a first social status posted by a first user account.

The first social status is a current social status of the first user account. The social status may be a social status selected by the user for posting, or may be an actual social status of the user determined according to related data.

For example, the first social status is a social status posted by the first user account in the virtual world-based social application program; or the first social status is a social status posted by the first user account in another application program; or the first social status is a social status determined according to an update (social information) posted by the first user account in another application program; or the first social status is a social status determined according to a trigger event of the first user account in another application program; or the first social status is a social status determined according to positioning data of the terminal; or the first social status is a social status determined according to sport data provided by a wearable device associated with the terminal; or the first social status is determined according to a social plan of the first user account, where the social plan is configured for reflecting social statuses of the first user account within different time periods of preset duration.

Therefore, operation 220 may be independently completed by the virtual world-based social application program (the social status is determined based on data in the application). Operation 220 may alternatively be completed through interaction between the virtual world-based social application program and another application program (related data is obtained from another application and the social status is determined).

The related data is obtained through authorization of the user. After the user agrees, the virtual world-based social application program may obtain the related data from another application program, to determine the current first social status of the first user account. In this way, the virtual character in the virtual world can react to a status of the user in reality in real time, thereby synchronously simulating social life of the user.

The virtual world-based social application program provides a plurality of social statuses, and the first social status is one of the plurality of social statuses. Alternatively, the virtual world-based social application program provides a plurality of general categories of social statuses, and the user may edit a customized social status based on the general categories of social statuses. For example, based on the social statuses being classified into categories such as sports, resting, and entertainment, the user may select the sports category and edit the social status to running. Alternatively, the user may completely customize the social status.

In one embodiment, the social status corresponds to an icon, and different social statuses correspond to different icons. The icon is also displayed in association with the virtual character, to indicate a current social status of the virtual character. For example, the icon is displayed above the head of the virtual character.

In one embodiment, social information edited by the virtual character may be further displayed next to the icon. When setting the social status, the user may also edit the social information. The social information may be at least one of text information or speech information. After the user posts the social status, the icon of the social status and the social information edited by the user are displayed above the head of the virtual character.

Operation 230: Display a first virtual character corresponding to the first user account in a first scene block building corresponding to the first social status, the first virtual character being in an activity status corresponding to the first social status, and the first scene block building being one of the at least two scene block buildings.

Each scene block building corresponds to at least one social status, and one social status uniquely corresponds to one scene block building. In this case, the first social status uniquely corresponds to the first scene block building.

Alternatively, one social status may correspond to a plurality of scene block buildings. When setting the social status, the user needs to select a scene block building from the plurality of scene block buildings corresponding to the social status. After the user posts the social status, the virtual character is placed in the scene block building selected by the user. Alternatively, the server randomly selects a scene block building from the plurality of scene block buildings corresponding to the social status, and places the virtual character in the scene block building.

In this embodiment of this application, an example in which each scene block building corresponds to at least one social status, and each social status uniquely corresponds to one scene block building is used for description.

For example, in response to that the user selects and posts the first social status, the client in the terminal transmits the first social status selected by the user to the server; the server determines the corresponding first scene block building according to the first social status selected by the user, determines a first location in the first scene block building, and returns the first scene block building and the first location to the client; and the client displays the first virtual character at the first location of the first scene block building according to an indication of the server, and displays the first virtual character in the activity status corresponding to the first social status.

The first virtual character is displayed as a two-dimensional character, a 2.5-dimensional character, or a three-dimensional character. The first virtual character may be a human, an animal, or a fictional creature. The first virtual character has limbs, and can make different actions as required. The first virtual character corresponds to the first user account. In one embodiment, one user account corresponds to one virtual character. Alternatively, one user account may register different virtual characters in different virtual regions, and the first virtual character is a virtual character to which the first user account currently logs in.

For example, when the first social status is studying, the first scene block building includes a classroom, and the activity status corresponding to the first social status includes a studying state; when the first social status is exercising, the first scene block building includes a sports field, and the activity status corresponding to the first social status includes an exercising state; when the first social status is that mercury retrograde is about to retreat, the first scene block building includes a sunlight garden, and the activity status corresponding to the first social status includes a praying state; when the first social status is music listening, the first scene block building includes a sunlight garden, and the activity status corresponding to the first social status includes a music listening state; when the first social status is sleeping, the first scene block building includes a home, and the activity status corresponding to the first social status includes a sleeping state; or when the first social status is gaming, the first scene block building includes an entertainment hall, and the activity status corresponding to the first social status includes a gaming state.

Figure 4:
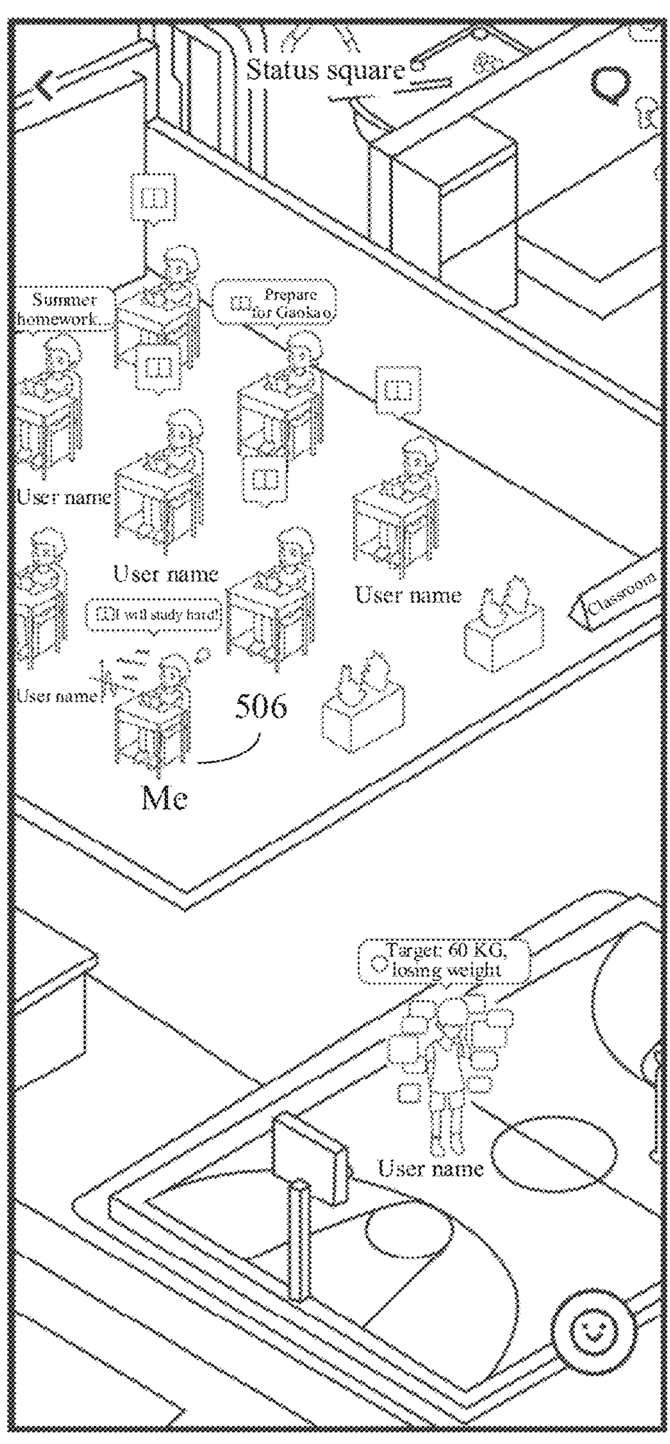
FIG. 4 is a schematic diagram of a virtual world according to another exemplary embodiment of this application.

For example, as shown in FIG. 4, when the first social status is studying, a first virtual character 506 is placed in the classroom, and the first virtual character is in the studying state. Through providing corresponding first scene block buildings to different first social statuses, rich scene block buildings are provided, to accommodate virtual characters in different social statuses.

In conclusion, according to the method provided in this embodiment, a plurality of scene block buildings are arranged in a virtual world, so that virtual characters in different social statuses can be placed in different scene block buildings. For example, a virtual character that is exercising is placed in a stadium, a virtual character that is walking is placed in a park, and a virtual character that is studying is placed in a library. Then, the virtual characters may be displayed in the different scene block buildings according to the social statuses of the virtual characters. When the virtual character is displayed according to an activity status corresponding to the social status, the displayed virtual character can match the scene block building, to avoid disharmony between the displayed virtual character and a location of the displayed virtual character in the virtual world, and ensure that a picture presented to a user is always logical in the real world. After the virtual character changes the social status of the virtual character, the virtual character can enter a pre-planned scene. In this way, an association can be established between the virtual character and the scene, so that the virtual character has a sense of belonging, and the user also has power to set the status. In addition, strangers in the same social status may be displayed in the corresponding scene block building, thereby improving a social success rate.

For example, the embodiments of this application provide a plurality of manners for determining the first user account, so that the virtual character in the virtual world is synchronized with the actual social status of the user as much as possible.

Figure 5:
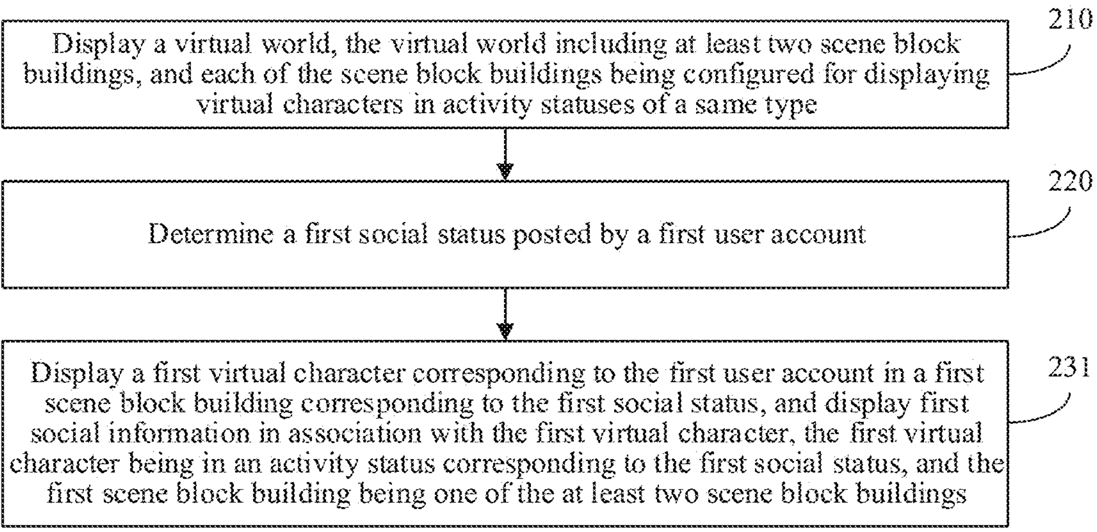
FIG. 5 is a method flowchart of a virtual character display method according to an exemplary embodiment of this application.

FIG. 5 is a flowchart of a virtual character display method according to an exemplary embodiment of this application. The method may be performed by a computer device or a client in the computer device, for example, the terminal or the client in the terminal shown in FIG. 1. The method includes the following operations.

Operation 210: Display a virtual world, the virtual world including at least two scene block buildings, and each of the scene block buildings being configured for displaying virtual characters in activity statuses of a same type.

Operation 220: Determine a first social status posted by a first user account.

In one embodiment, a plurality of manners for determining the social status of the first user account are provided in this embodiment of this application. The terminal device may determine the social status of the first user account in at least one of the following manners.

Manner 1: Set a social status of a first virtual character in the virtual world.

A status editing control is displayed in the virtual world; a status editing interface is displayed in response to a trigger operation performed on the status editing control, the status editing interface including a status selection region, and at least one social status being displayed in the status selection region; and the first social status is determined in the at least one social status in response to a social status selection operation.

As shown in (1) of FIG. 6, a status editing control 507 is displayed in a picture of the virtual world. A user triggers the status editing control 507 to display a status editing interface 508 shown in (2) of FIG. 6, where at least one social status is displayed in the status editing interface 508. If the user selects studying 509 (the first social status), a picture shown in (3) of FIG. 6 is displayed, a first virtual character 506 is displayed in a scene, namely, a classroom, corresponding to the state of studying 509, and the first virtual character 506 is displayed in the studying state.

In one embodiment, the status editing interface further includes a status information editing region. The status information editing region may be configured for receiving an input operation by the user, to display social information inputted by the user. For example, the status information editing region may be configured for receiving an operation by the user inputting text, to display text information inputted by the user; or receiving an operation by the user inputting a speech, to display a speech bar.

The status editing interface further includes a posting control. After the user selects the social status and edits the social information (exemplary), the user may tap on the posting control to post the social status. In response to that the user posts the first social status, a location of the first virtual character in the virtual world is updated and displayed according to the first social status posted by the user.

Manner 2: Select a scene block building in the virtual world and set a social status of a first virtual character.

A status editing interface corresponding to a first scene block building is displayed in response to an operation of triggering the first scene block building, the status editing interface including a status selection region, and at least one social status corresponding to the first scene block building being displayed in the status selection region; and the first social status is determined in the at least one social status corresponding to the first scene block building in response to a social status selection operation.

As shown in (1) of FIG. 7, a user taps on a scene block building in a picture of the virtual world, for example, taps on a sports field 502, to display a status editing interface shown in (2) of FIG. 7, where at least one social status corresponding to the sports field 502 is displayed in the status editing interface. The user may select and post exercising 510 (the first social status). In this case, as shown in (3) of FIG. 7, a first virtual character 506 is displayed in the sports field, and the first virtual character is displayed in an exercising state.

In one embodiment, the status editing interface further includes a status information editing region. The status information editing region may be configured for receiving an input operation by the user, to display social information inputted by the user. For example, the status information editing region may be configured for receiving an operation by the user inputting text, to display text information inputted by the user; or receiving an operation by the user inputting a speech, to display a speech bar.

The status editing interface further includes a posting control. After the user selects the social status and edits the social information (exemplary), the user may tap on the posting control to post the social status. In response to that the user posts the first social status, a location of the first virtual character in the virtual world is updated and displayed according to the first social status posted by the user.

The status editing interface in Manner 1 is different from the status editing interface in Manner 2. The status editing interface in Manner 1 is referred to as a first status editing interface, and the status editing interface in Manner 2 is referred to as a second status editing interface. The social statuses displayed in the first status editing interface are all social statuses, and the social statuses displayed in the second status editing interface are social statuses corresponding to the first scene block building. In other words, the social statuses in the first status editing interface include the social statuses in the second status editing interface.

In another exemplary manner, the user may directly drag the virtual character from one scene block building to a region corresponding to another scene block building in the virtual world, and then display a status editing interface corresponding to the another scene block building. For example, in response to that an operation of dragging the first virtual character to the first scene block building is received, the status editing interface is displayed, where at least one social status corresponding to the first scene block building is displayed in the status editing interface. In response to an operation of selecting and posting the first social status, the first virtual character is displayed in the first scene block building, and the first virtual character is displayed in an activity status corresponding to the first social status.

Manner 3: Obtain the social status of the first user account from another application program.

A program event of the first user account in the another application program is obtained, the another application program including at least one of an instant messaging program, a social media program, a music program, a local service program, a sport program, an office program, a conferencing program, or a video program; and the first social status of the first user account in the virtual world is determined based on the program event in the another application program.

A current social status of a user is obtained according to the program event in the another application program.

In one embodiment, when a program event occurs, the another application program may transmit the program event to a virtual world-based social application program. The virtual world-based social application program updates the first user account to the corresponding social status according to the program event, and displays the virtual character in a scene block building of the virtual world according to the social status.

Alternatively, the virtual world-based social application program may periodically request a program event from the another application program, update the social status of the first user account based on the requested program event, and display the virtual character in a scene block building of the virtual world according to the social status.

Alternatively, when the user logs in, the virtual world-based social application program may request a program event from the another application program, determine the social status of the first user account based on the requested program event, and display the virtual character in a scene block building of the virtual world according to the social status.

The virtual world-based social application program may obtain the program event from the another application program after user authorization. The program event includes at least one of a running status, a currently displayed page, running data, or a program type of the another application program.

For example, the first social status of the first user account in the virtual world is determined based on a social update posted by the first user account in the instant messaging program or the social media program or the local service program.

For example, based on a category of the social update posted by the first user account in the instant messaging program or the social media program or the local service program, the first social status corresponding to the category is determined. For example, if the user posts a short video classified as sports in the social media program, the social media program transmits the "sports" category of the short video to the virtual world-based social application program, and the virtual world-based social application program sets the social status of the first user account to exercising. If the user posts the social status currently in a reading state in the social media program, the social media program transmits the "reading" category of the social status to the virtual world-based social application program, and the virtual world-based social application program sets the social status of the first user account to reading. In one embodiment, when the first user account posts the social update in the instant messaging program or the social media program or the local service program, the instant messaging program or the social media program or the local service program transmits the posted social update to the virtual world-based social application program, to determine the first social status of the first user account in the virtual world.

Alternatively, the first social status of the first user account in the virtual world is determined based on a music playback event of the first user account in the music program.

The music playback event includes at least one of playing, pausing, or a type of music being played. Whether the user is listening to music may be determined according to a playback state, and a mood of the user may be determined according to the type of music being played, so that a social status related to the mood can be set. For example, if the music playback event is playing, the social status of the first user account may be determined as listening to music. If the music playback event is that the type of music being currently played is a happy type, the social status of the first user account may be determined as happy. In one embodiment, when the first user account logs in to the music program for the first time or the music program detects the foregoing playback event, the music program transmits the music playback event to the virtual world-based social application program, to determine the first social status of the first user account in the virtual world.

Alternatively, the first social status of the first user account in the virtual world is determined based on sport data of the first user account in the sport program.

The sport data may include data such as a sport status, human vital sign data, a sport path, a sport device, and the like. The corresponding social status may be directly determined based on the sport status. For example, as long as there is a sport status, the social status is determined as exercising. Alternatively, the social status is determined based on a specific sport status type. For example, if the sport status is a riding state, the social status is riding. If the human vital sign data indicates that the user is exercising, the social status is exercising. Alternatively, the social status is determined according to a sport device type currently associated with the sport program. For example, if a treadmill is associated, the social status is running/exercising. In one embodiment, when the sport program detects the sport data of the first user account, the sport program transmits the sport data to the virtual world-based social application program, to determine the first social status of the first user account in the virtual world.

Alternatively, the first social status of the first user account in the virtual world is determined based on an office event of the first user account in the office program.

The office event may be typing, producing a document, editing a video, or the like. According to the office event, the social status of the first user account may be set to working/typing, or the like. In one embodiment, when the first user account logs in to the office program and the office program detects the foregoing office event, the office program transmits the office event to the virtual world-based social application program, to determine the first social status of the first user account in the virtual world.

Alternatively, the first social status of the first user account in the virtual world is determined based on a call status of the first user account in the conferencing program.

If the call status is in-call, the social status of the first user account may be set to in-call/in-conference. In one embodiment, when the first user account logs in to the conferencing program and the conferencing program detects that the call status of the first user account is in-call/in-conference, the conferencing program transmits the call status to the virtual world-based social application program, to determine the first social status of the first user account in the virtual world.

Alternatively, the first social status of the first user account in the virtual world is determined based on a video playback status of the first user account in the video program.

The video program includes an application program that supports video playback, such as a video on demand program, a short video program, or a live streaming video program. The video playback status is configured for reflecting whether the user of the first user account currently watches a video in the video program. If the user of the first user account currently watches a video, the social status of the first user account may be set to video watching, so that the first virtual character enters a behavioral state of watching a video in a scene block building configured for watching a video. If the user of the first user account currently does not watch a video, the social status of the first user account may be set to video searching, so that the first virtual character enters a behavioral state of searching for a video in the scene block building configured for watching a video. For example, the first virtual character is watching a movie in a movie auditorium of a movie theater, or walking in a hallway for connecting different movie auditoriums in the movie theater. In one embodiment, when the first user account logs in to the video program and the video program detects that the video playback status of the first user account is changed, the video program transmits the video playback status to the virtual world-based social application program, to determine the first social status of the first user account in the virtual world.

In one embodiment, the user account logged in to in the another application program is the first user account. When the virtual world-based social application program supports interaction with a plurality of the foregoing application programs, the first social status of the first user account may be determined according to information provided by the application program selected by the first user account; or the first social status of the first user account is switched according to a time sequence in which different application programs provide information; or the first social status of the first user account is switched according to priorities of different application programs and a time sequence in which the different application programs provide information. For example, two application programs provide information at the same time. In this case, the first social status of the first user account pin is determined according to the information provided by the application program with a higher priority.

Manner 4: Obtain the social status of the first user account through a wearable device.

The wearable device is associated with the terminal. The first social status of the first user account is determined based on sport data provided by the wearable device, the first social status being one of sport statuses.

The wearable device may be configured to monitor sport data, such as a number of steps, a heart rate, a sport type, and sleep. Based on different sport data, the social status of the first user account may be set to walking/running/riding/sleeping/the like.

Manner 5: Determine the social status of the first user account through positioning by the terminal.

The first social status of the first user account is determined based on a positioned location indicated by positioning data of the terminal.

For example, if the terminal is located in a library, the social status of the first user account is set to studying; if the terminal is located in a restaurant, the social status of the first user account is set to eating; or if the terminal is located in a shopping mall, the social status of the first user account is set to shopping.

Manner 6: Determine the social status of the first user account through a social plan.

The first user account can set the social plan in the client, where the social plan is configured for reflecting social statuses of the first user account within different time periods of preset duration. The preset duration and division of the time periods are preset in the client, or customized by a user. For example, the preset duration is one day, and the social plan is configured for reflecting social statuses of the first user account within different time periods of one day. For example, a social status from 8:00 to 17:00 is working, a social status from 18:00 to 19:00 is running, and a social status from 20:00 to 21:00 is listening to music. Through obtaining the social plan of the first user account, the first social status of the first user account can be determined according to current time and the social plan.

In one embodiment, the client periodically triggers the determining the first social status of the first user account according to current time and the social plan, for example, once every hour. Alternatively, after the first user account sets the social plan, the client sets a timing task for a start moment of each time period in the social plan, and determines a current social status of the first user account by executing the timing task.

In one embodiment, the client may further recommend a similar user account to the first user account based on the social plan set by the first user account. The client displays the similar user account recommended to the first user account in a user interface, a social plan of the similar user account matching the social plan of the first user account in n consecutive preset durations, n being a positive integer. The social plan of the similar user accounts matching the first user account includes: Time periods set in the social plan are the same, and social statuses corresponding to the time periods are the same; or an intersection time period exists in time periods set in the social plans, and social statuses corresponding to the intersection period are the same; or social statuses set in the social plans are the same; or a number of same social statuses in a plurality of social statuses set in the social plans satisfies a number threshold.

Operation 231: Display a first virtual character corresponding to the first user account in a first scene block building corresponding to the first social status, and display first social information in association with the first virtual character, the first virtual character being in an activity status corresponding to the first social status, and the first scene block building being one of the at least two scene block buildings.

In one embodiment, the first social status further corresponds to the first social information, and the first social information may also be displayed near the first virtual character. In other words, the first social information is displayed in association with the first virtual character in the first scene block building.

For example, as shown in FIG. 4, social information of "I will study hard!" is displayed above the head of the first virtual character 506.

In conclusion, according to the method provided in this embodiment, a user may set a social status of a first user account in a virtual world-based social application program, and the user may also directly tap on a scene block building to quickly switch the social status. The virtual world-based social application program may alternatively determine the social status by obtaining a program event from another application program, the virtual world-based social application program may alternatively determine the social status based on sport data provided by a wearable device, the virtual world-based social application program may alternatively determine the social status based on positioning by a terminal, or the virtual world-based social application program may alternatively determine the social status based on a social plan preset by the user. The social status of the user is determined through the plurality of manners described above, thereby improving accuracy of the social status. In addition, virtual characters in a same social status are placed in a same scene block building for display, to guide users in the same social status to perform interaction with each other, thereby improving a social success rate.

According to the method provided in this embodiment, through providing detection to a trigger operation performed on a status editing control, a social status selection operation is determined, to determine a first social status of the first user account, so that a manner for setting the first social status that is visual and consistent with operation intuition of the user is provided. Through providing a status editing interface corresponding to a first scene block building, the first social status of the first user account is determined according to the social status selection operation, so that the user is guided to set the first social status consistent with the first scene block building through the status editing interface corresponding to the first scene block building.

According to the method provided in this embodiment, the first social status of the user in the virtual world is alternatively set according to a program event of the user in the another application program, so that a manner for automatically setting the first social status of the user without a user operation is provided, and the set first social status is consistent with a current behavior of the user. The first social status is set according to program events in a plurality of different application programs, thereby improving richness of setting the first social status.

According to the method provided in this embodiment, the first social status of the first user account is alternatively determined according to the sport data provided by the wearable device, so that a manner for automatically setting the first social status related to sport for the user without a user operation is provided, and the set first social status is consistent with a current sport behavior of the user.

According to the method provided in this embodiment, the first social status of the first user account is alternatively determined according to positioning information, so that a manner for automatically setting the first social status of the user without a user operation is provided, and the set first social status is consistent with a current location of the user.

According to the method provided in this embodiment, the first social status of the first user account is alternatively determined according to the social plan, so that the user can preset the first social status within different time periods according to a need of the user, thereby avoiding an operation by the user frequently modifying the first social status. A similar user account is recommended to the user, so that another user with a similar plan is recommended to the user, thereby helping improve social interaction efficiency.

According to the method provided in this embodiment, first social information corresponding to the first social status is further displayed, so that information that the user intends to present to other users during social interaction can be presented, thereby improving social interaction efficiency.

For example, the user may also chat with another user account in the virtual world, and automatically control, based on chat content, the virtual character in the virtual world to perform a corresponding action.

Figure 8:
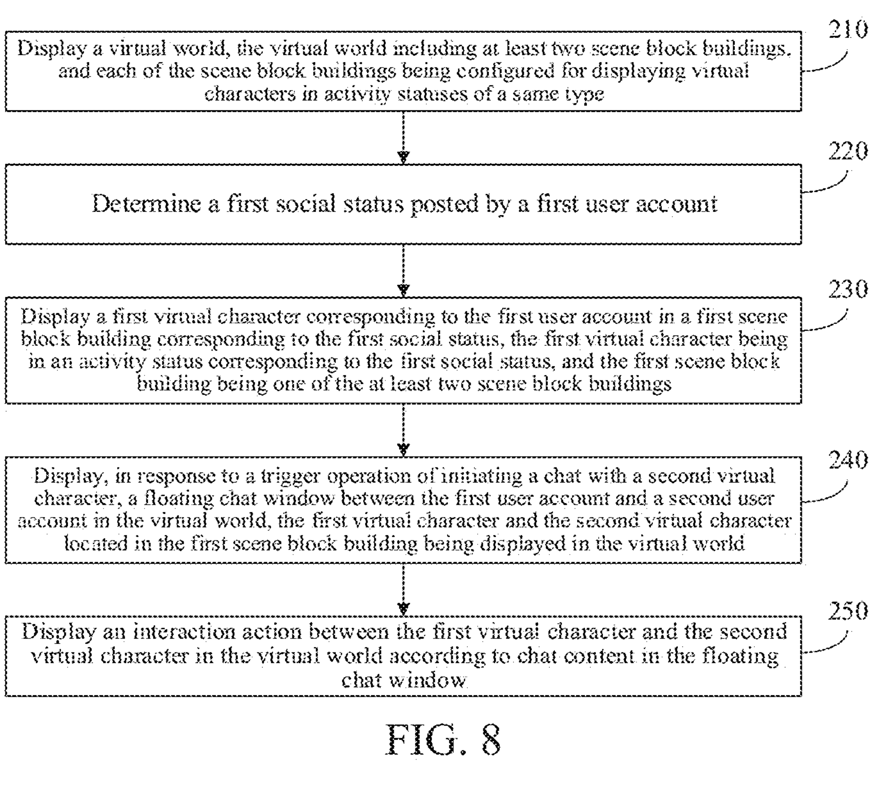
FIG. 8 is a method flowchart of a virtual character display method according to an exemplary embodiment of this application.

FIG. 8 is a flowchart of a virtual character display method according to an exemplary embodiment of this application. The method may be performed by a computer device or a client in the computer device, for example, the terminal or the client in the terminal shown in FIG. 1. The method includes the following operations.

Operation 210: Display a virtual world, the virtual world including at least two scene block buildings, and each of the scene block buildings being configured for displaying virtual characters in activity statuses of a same type.

A plurality of scene block buildings corresponding to status actions, such as a classroom, a playground, and a park, are pre-arranged in the virtual world. After a virtual character of a user sets a social status, the virtual character automatically enters a corresponding scene block building according to the social status. The user may alternatively first select a scene block building, and after the scene block building is tapped on, the user is asked whether to set the social status of the virtual character to a social status that can be included in the current scene block building, so that the social status is quickly switched.

There are a plurality of scene block buildings in the virtual world. The scene block buildings reflect real scenes corresponding to some social statuses. For example, a classroom carries virtual characters in a social status of studying. Virtual characters in the scene block buildings may be friends of the user or strangers.

Operation 220: Determine a first social status posted by a first user account.

The user may tap on a status change button to change the status of the virtual character. A status posting interface is opened after the tapping. After a to-be-posted social status is selected, the user may also edit to-be-posted status information (for example, "I will study hard!"). After the posting, the virtual character is automatically placed in a corresponding scene block building according to the social status posted by the virtual character. For example, the user sets the social status to studying, and the virtual character of the user enters a scene block building "classroom" after the posting.

The user may alternatively tap on a plot of a scene block building, to quickly change the social status. For example, if the user taps on a scene block building "sports field", the user is asked whether to set the social status to a social status that can exist in the sports field, for example, exercising. After the user taps to determine the social status, the virtual character can directly appear on the sports field, and the state of the virtual character is changed to exercising.

For other implementations of determining the first social status of the first user account, refer to related descriptions in the embodiment corresponding to FIG. 5. Details are not described herein in this application.

Operation 230: Display a first virtual character corresponding to the first user account in a first scene block building corresponding to the first social status, the first virtual character being in an activity status corresponding to the first social status, and the first scene block building being one of the at least two scene block buildings.

Operation 240: Display, in response to a trigger operation of initiating a chat with a second virtual character, a floating chat window between the first user account and a second user account in the virtual world, the first virtual character and the second virtual character located in the first scene block building being displayed in the virtual world.

For example, the user may tap on the second virtual character to invoke an interaction control corresponding to the second virtual character, where the interaction control may include a chat control, a nudge control, a gift control, and the like. If the user triggers the chat control, the floating chat window is displayed in a picture of the virtual world. In the floating chat window, the user may transmit chat content to the second user account, or display chat content transmitted by the second user account to the first user account.

If the user triggers the nudge control, the floating chat window may also be displayed in the picture of the virtual world, and a message "the first user account nudges the second user account" is displayed in the floating chat window. In one embodiment, if the user invokes the floating chat window through a nudge, the floating chat window is automatically popped up on a client of the second user account, so that the second user account quickly views chat content.

In one embodiment, a chat region, a chat content editing region, a transmit control, a facial expression selection control, and the like are displayed in the floating chat window. Information related to the second user account is further displayed in the floating chat window, to indicate that the floating chat window is a floating window for chatting with the second user account.

Operation 250: Display an interaction action between the first virtual character and the second virtual character in the virtual world according to chat content in the floating chat window.

In one embodiment, the first virtual character and/or the second virtual character in the virtual world are controlled to be displayed in the corresponding interaction action according to content transmitted by the first user account and/or content transmitted by the second user account in the floating chat window.

According to a first facial expression transmitted by the first user account in the floating chat window, the first virtual character is controlled to perform an action corresponding to the first facial expression; and/or according to a second facial expression transmitted by the second user account in the floating chat window, the second virtual character is controlled to perform an action corresponding to the second facial expression; and/or according to an interaction trigger message transmitted in the floating chat window, the first virtual character and the second virtual character are controlled to jointly perform the interaction action corresponding to the interaction trigger message.

For example, if the first user account transmits text "Hahahahahahaha", the first virtual character is controlled to temporarily switch the activity status corresponding to the first social status to a laughing state for display, and revert to the activity status corresponding to the first social status after a laughing action is completed.

For another example, if the second user account transmits a facial expression of spilling the tea together to the first user account, the first virtual character and the second virtual character are controlled to be displayed in an action of spilling the tea.

The first virtual character and the second virtual character are located in a same scene block building, in other words, only virtual characters within a same scene block building are allowed to chat. Alternatively, the first virtual character and the second virtual character may be located in different scene block buildings.

The second virtual character may be a virtual character controlled by the second user account, or the second virtual character may be a non-player character (NPC) or a chat robot fixedly set in the virtual world.

In conclusion, according to the method provided in this embodiment, when two user accounts communicate, virtual characters in a virtual world are displayed in a corresponding action according to communicated information of the two user accounts, to increase the fun of chatting, and facilitate communication and interaction between strangers. The virtual characters are triggered to be displayed in the corresponding action according to information transmitted by at least one of two users that perform social interaction, so that diversity of triggering manners can be ensured, and interaction efficiency between the users is improved.

For example, the social status in the embodiments of this application may alternatively be a social status in which a plurality of persons participate together.

Figure 9:
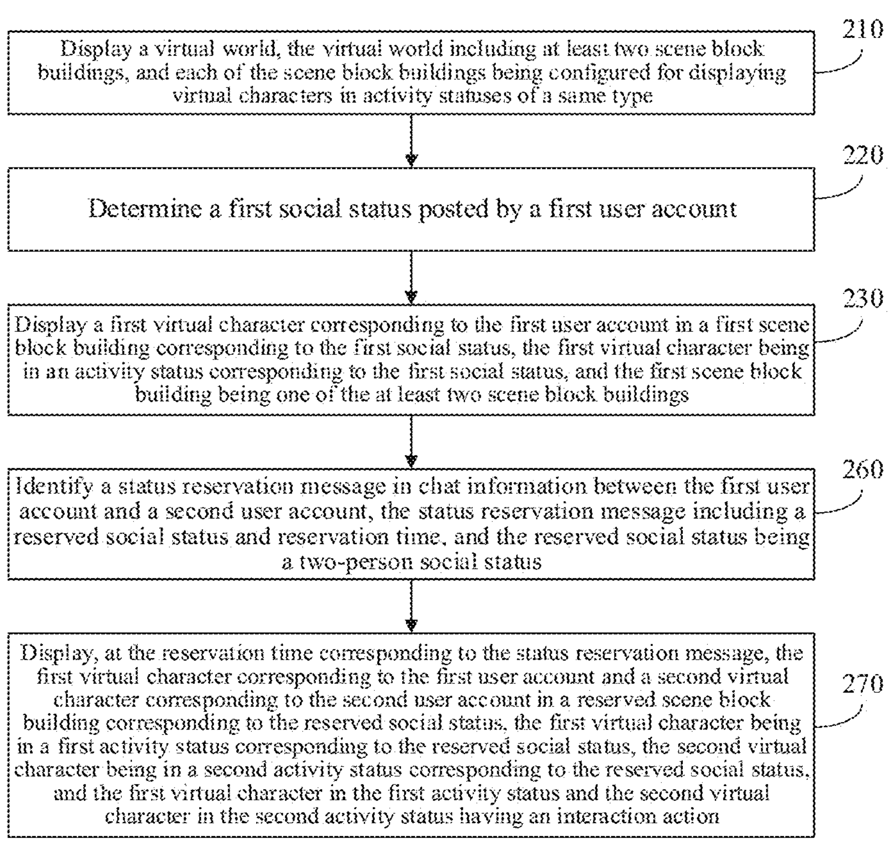
FIG. 9 is a method flowchart of a virtual character display method according to an exemplary embodiment of this application.

FIG. 9 is a flowchart of a virtual character display method according to an exemplary embodiment of this application. The method may be performed by a computer device or a client in the computer device, for example, the terminal or the client in the terminal shown in FIG. 1. The method includes the following operations.

Operation 210: Display a virtual world, the virtual world including at least two scene block buildings, and each of the scene block buildings being configured for displaying virtual characters in activity statuses of a same type.

Operation 220: Determine a first social status posted by a first user account.

Operation 230: Display a first virtual character corresponding to the first user account in a first scene block building corresponding to the first social status, the first virtual character being in an activity status corresponding to the first social status, and the first scene block building being one of the at least two scene block buildings.

Operation 260: Identify a status reservation message in chat information between the first user account and a second user account, the status reservation message including a reserved social status and reservation time, and the reserved social status being a two-person social status.

When the first user account and the second user account jointly post the status reservation message in an instant messaging program, the instant messaging program may transmit the status reservation message to a virtual world-based social application program. The virtual world-based social application program may control, based on the status reservation message, the first virtual character and a second virtual character to be displayed in a corresponding multi-person interaction social status.

For example, the reserved social status may be playing badminton, dating, singing, or the like.

Operation 270: Display, at the reservation time corresponding to the status reservation message, the first virtual character corresponding to the first user account and the second virtual character corresponding to the second user account in a reserved scene block building corresponding to the reserved social status, the first virtual character being in a first activity status corresponding to the reserved social status, the second virtual character being in a second activity status corresponding to the reserved social status, and the first virtual character in the first activity status and the second virtual character in the second activity status having an interaction action.

For example, if the first user account and the second user account reserve a dating at a park at ten o'clock tomorrow, the virtual world-based social application program may display, at ten o'clock tomorrow, the first virtual character and the second virtual character in the park, and display the first virtual character and the second virtual character in the activity status of dating. When another user account views the two virtual characters in the park, it can be learned that the two user accounts are dating.

In one embodiment, because the reserved social status is the two-person social status or the multi-person social status, a plurality of virtual characters jointly participating in the reserved social status have a combined action to jointly present the reserved social status. For example, when the reserved social status is playing badminton, the first virtual character and the second virtual character may be displayed on both sides of a badminton network respectively, and the first virtual character and the second virtual character respectively hold badminton rackets facing the other party.

In addition, the virtual world-based social application program may further obtain a team status of a user account from a game program. If the first user account, the second user account, and a third user account enter a same team room in the game program, the game program may transmit the first user account, the second user account, the third user account, and a room number to the virtual world-based social application program, to inform that the three user accounts are located in the same team room. In this case, the virtual world-based social application program may display three virtual characters corresponding to the three user accounts in one game room in the virtual world, to indicate that the three user accounts are playing a team game. After the game starts, the game program may further transmit the room number and a game start indication to the virtual world-based social application program, and the virtual world-based social application program may display the virtual characters of the plurality of user accounts corresponding to the room number in an activity status of gaming.

In conclusion, according to the method provided in this embodiment, a multi-person social status is provided, and a plurality of virtual characters are displayed in combination based on an obtained social status in which a plurality of user accounts jointly participate, to identify that the plurality of virtual characters jointly participate in the social status. In this way, diversity of displaying activity statuses of the virtual characters in a virtual world is increased, offline communication of users is facilitated, and a social success rate is improved.

Figure 10:
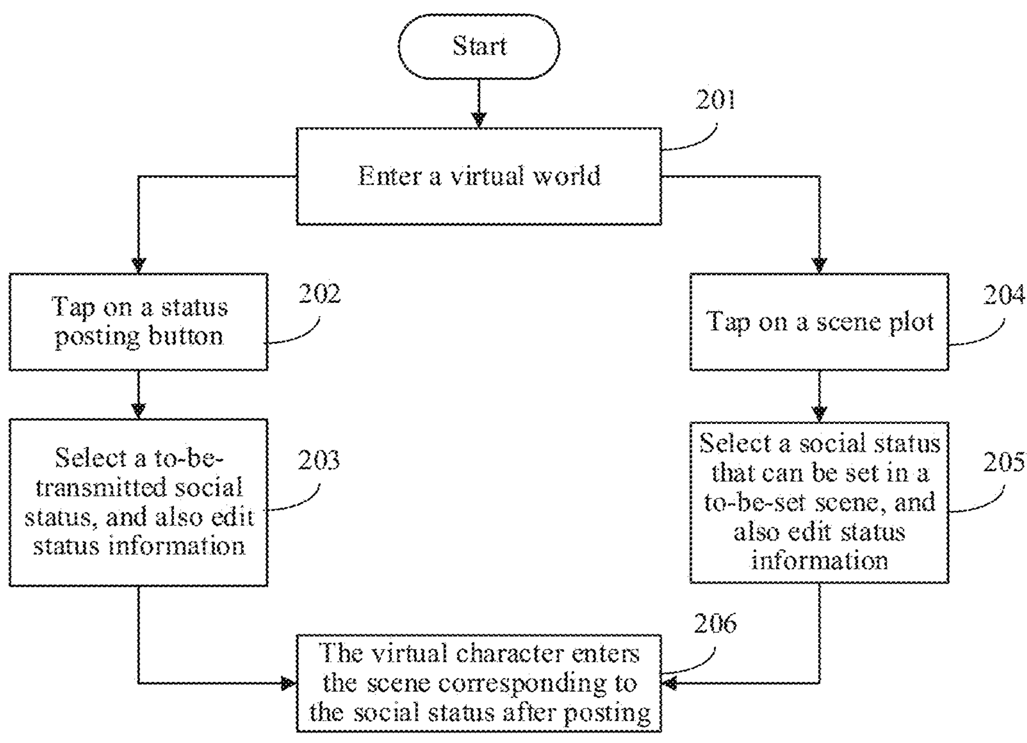
FIG. 10 is a method flowchart of a virtual character display method according to an exemplary embodiment of this application.

FIG. 10 is a flowchart of a virtual character display method according to an exemplary embodiment of this application. The method may be performed by a computer device or a client in the computer device, for example, the terminal or the client in the terminal shown in FIG. 1. The method includes the following operations.

Operation 201: Receive an operation of entering a virtual world, and display the virtual world, the virtual world including at least two scene block buildings, and each of the scene block buildings being configured for displaying virtual characters in activity statuses of a same type.

In the virtual world, a plurality of scene block buildings are preset. After a user enters the virtual world, there are two manners for posting or changing a social status of the user.

Operation 202: Receive an operation of tapping on a status posting button.

The user taps on the status posting button, to enter a page for posting a status. All social statuses are listed on the page. After the user selects a social status, status information may be also edited. Such social information is displayed on a head of a virtual character after the user posts the social status. Each social status corresponds to one scene block building (one scene block building may include a plurality of social statuses). After the user posts the social status, the virtual character of the user is placed in a corresponding scene block building according to the social status posted by the user, and a screen is translated to a location of the virtual character at the same time.

Operation 203: Receive an operation of selecting a to-be-transmitted social status, and also receive an operation of editing the status information.

Operation 204: Receive an operation of taping on a scene plot.

The user taps on a plot of a scene block building, to pop up an interface for asking the user for a to-be-set social status. In this case, the social status that the user may select is only a social status that the scene block building can support, but not all social statuses. The user may also edit status information during posting. After the user determines the posting, a virtual character of the user is placed in a corresponding scene block building, and a screen is translated to a location of the virtual character at the same time.

Operation 205: Receive an operation of selecting a social status that can be set in a to-be-set scene, and also receive an operation of editing the status information.

Operation 206: The virtual character enters the scene corresponding to the social status after the social status is posted.

In conclusion, according to the method provided in this embodiment, a single status setting behavior for a virtual character is combined with scene distribution of a virtual world, to create immersive and world-view virtual experience; a user has a clear and intense motivation to set a status of a virtual character of the user, to facilitate occurrence of a social behavior; and users in a same scene naturally have a common topic, to reduce a social threshold, and improve a social success rate between a strangers.

Figure 11:
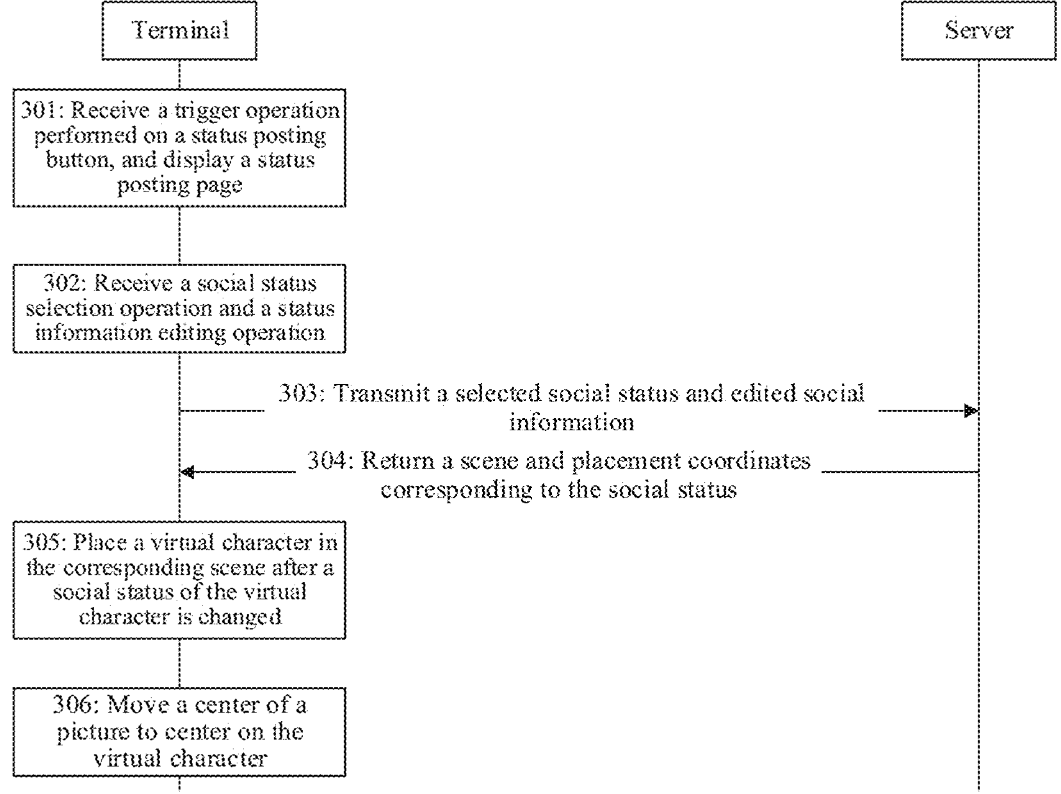
FIG. 11 is a method flowchart of a virtual character display method according to an exemplary embodiment of this application.

FIG. 11 is a flowchart of a virtual character display method according to an exemplary embodiment of this application. The method may be performed by a computer device or a client in the computer device, for example, the terminal and the server shown in FIG. 1. The method includes the following operations.

Operation 301: The terminal receives a trigger operation performed on a status posting button, and displays a status posting page.

A status editing control (status button) is displayed in a virtual world. The terminal displays a status editing interface (status posting page) in response to the trigger operation performed on the status editing control, the status editing interface including a status selection region, and at least one social status being displayed in the status selection region. For example, a user taps on the status posting button, to enter a page for posting a status. All social statuses are listed on the page. After the user selects a social status, status information may be also edited. Such social information is displayed on a head of a virtual character after the user posts the social status. Each social status corresponds to one scene block building (one scene block building may include a plurality of social statuses).

Operation 302: The terminal receives a social status selection operation and a status information editing operation.

The terminal determines the first social status in the at least one social status in response to the social status selection operation, and the terminal can also receive edited social information when selecting the social status.

Operation 303: The terminal transmits the selected social status and the edited social information to the server.

After the social status and the edited social information are obtained, the terminal transmits the social status and the edited social information to the server, to determine a location indicated by the server for placing the virtual character in the virtual world.

Operation 304: The server returns a scene and placement coordinates corresponding to the social status to the terminal.

After the social status is obtained, the server may determine the scene corresponding to the social status according to correspondences between different social statuses and different scene block buildings (scenes). In one embodiment, the placement coordinates are randomly selected in the scene.

Operation 305: The terminal places the virtual character onto the placement coordinates in the corresponding scene after the social status of the virtual character is changed.

After the placement coordinates transmitted by the server are received, the terminal places the virtual character onto the placement coordinates, that is, in the scene corresponding to the social status.

Operation 306: The terminal moves a center of a picture to center on the virtual character.

The center of the picture is moved to center on the virtual character, so that the scene in which the virtual character is located can be displayed in focus, thereby helping observe other virtual characters in the same scene.

In conclusion, according to the method provided in this embodiment, a plurality of scene block buildings are arranged in a virtual world, so that virtual characters in different social statuses can be placed in different scene block buildings. For example, a virtual character that is exercising is placed in a stadium, a virtual character that is walking is placed in a park, and a virtual character that is studying is placed in a library. Then, the virtual characters may be displayed in the different scene block buildings according to the social statuses of the virtual characters. When the virtual character is displayed according to an activity status corresponding to the social status, the displayed virtual character can match the scene block building, to avoid disharmony between the displayed virtual character and a location of the displayed virtual character in the virtual world, and ensure that a picture presented to a user is always logical in the real world. After the virtual character changes the social status of the virtual character, the virtual character can enter a pre-planned scene. In this way, an association can be established between the virtual character and the scene, so that the virtual character has a sense of belonging, and the user also has power to set the status. In addition, strangers in the same social status may be displayed in the corresponding scene block building, thereby improving a social success rate.

Figure 12:
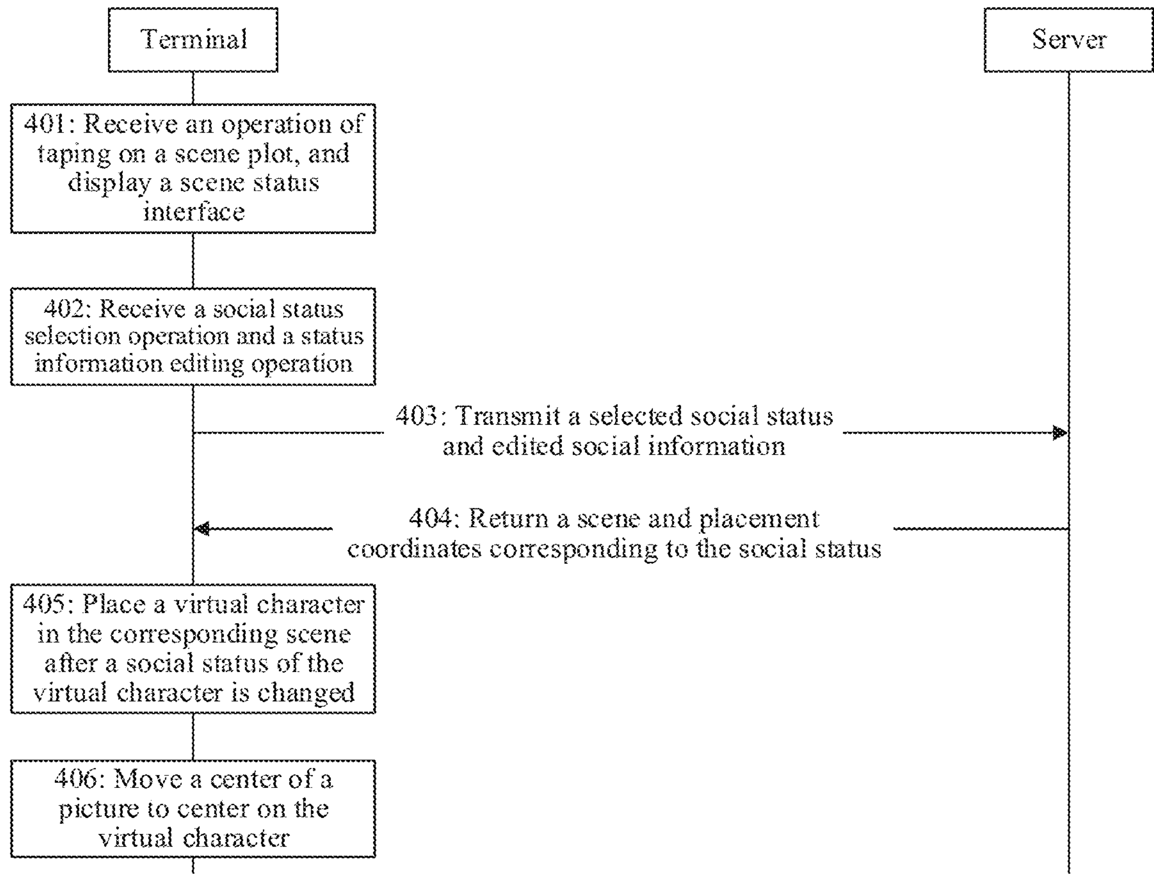
FIG. 12 is a method flowchart of a virtual character display method according to an exemplary embodiment of this application.

FIG. 12 is a flowchart of a virtual character display method according to an exemplary embodiment of this application. The method may be performed by a computer device or a client in the computer device, for example, the terminal and the server shown in FIG. 1. The method includes the following operations.

Step 401: The terminal receives an operation of taping on a scene plot, and displays a scene status interface.

The terminal displays a status editing interface (scene status interface) corresponding to the scene plot in response to an operation of triggering a first scene block building (scene plot), the status editing interface including a status selection region, and at least one social status corresponding to the first scene block building being displayed in the status selection region.

Operation 402: The terminal receives a social status selection operation and a status information editing operation.

The terminal determines a social status selected by a user in the at least one social status corresponding to the first scene block building in response to the social status selection operation, and the terminal can also receive edited social information when selecting the social status.

Operation 403: The terminal transmits the selected social status and the edited social information to the server.

After the social status and the edited social information are obtained, the terminal transmits the social status and the edited social information to the server, to determine a location indicated by the server for placing the virtual character in the virtual world.

Operation 404: The server returns a scene and placement coordinates corresponding to the social status to the terminal.

After the social status is obtained, the server may determine the scene corresponding to the social status according to correspondences between different social statuses and different scene block buildings (scenes). In one embodiment, the placement coordinates are randomly selected in the scene.

Operation 405: The terminal places the virtual character onto the placement coordinates in the corresponding scene after the social status of the virtual character is changed.

After the placement coordinates transmitted by the server are received, the terminal places the virtual character onto the placement coordinates, that is, in the scene corresponding to the social status.

Operation 406: The terminal moves a center of a picture to center on the virtual character.

The center of the picture is moved to center on the virtual character, so that the scene in which the virtual character is located can be displayed in focus, thereby helping observe other virtual characters in the same scene.

In conclusion, according to the method provided in this embodiment, a plurality of scene block buildings are arranged in a virtual world, so that virtual characters in different social statuses can be placed in different scene block buildings. For example, a virtual character that is exercising is placed in a stadium, a virtual character that is walking is placed in a park, and a virtual character that is studying is placed in a library. Then, the virtual characters may be displayed in the different scene block buildings according to the social statuses of the virtual characters. When the virtual character is displayed according to an activity status corresponding to the social status, the displayed virtual character can match the scene block building, to avoid disharmony between the displayed virtual character and a location of the displayed virtual character in the virtual world, and ensure that a picture presented to a user is always logical in the real world. After the virtual character changes the social status of the virtual character, the virtual character can enter a pre-planned scene. In this way, an association can be established between the virtual character and the scene, so that the virtual character has a sense of belonging, and the user also has power to set the status. In addition, strangers in the same social status may be displayed in the corresponding scene block building, thereby improving a social success rate.

In this application, before and during acquisition of relevant data of the user (for example, a social status posted by the user, and information of the user in another application program), a prompt interface or a pop-up window may be displayed, or speech prompt information may be outputted. The prompt interface, the pop-up window, or the speech prompt information is configured for prompting the user that relevant data of the user is currently being acquired. In this way, in this application, only after a confirmation operation performed by the user on the prompt interface or the pop-up window is obtained, the relevant operations of obtaining the relevant data of the user start to be performed. Otherwise (in other words, when the confirmation operation performed by the user on the prompt interface or the pop-up window is not obtained), the relevant operations of obtaining the relevant data of the user are ended, that is, the relevant data of the user is not obtained. In other words, all user data acquired in this application is acquired with user consent and authorization, and acquisition, use, and processing of relevant user data need to comply with relevant laws, regulations, and standards of relevant countries and regions.

The following describes apparatus embodiments of this application. For details not described in the apparatus embodiments, refer to corresponding descriptions in the foregoing method embodiments. Details are not described in this specification again.

Figure 13:
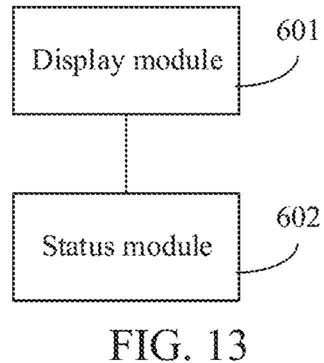
FIG. 13 is a block diagram of a virtual character display apparatus according to an exemplary embodiment of this application.

FIG. 13 is a structural schematic diagram of a virtual character display apparatus according to an exemplary embodiment of this application. The apparatus may be implemented as an entire computer device or a part of the computer device by using software, hardware, or a combination thereof. The apparatus includes:

a display module 601, configured to display a virtual world, the virtual world including at least two scene block buildings, and each of the scene block buildings being configured for displaying virtual characters in activity statuses of a same type; and a status module 602, configured to determine a first social status posted by a first user account, the display module 601 being configured to display a first virtual character corresponding to the first user account in a first scene block building corresponding to the first social status, the first virtual character being in an activity status corresponding to the first social status, the first scene block building being one of the at least two scene block buildings, a scene element being displayed in the scene block building, and the scene element matching the activity status corresponding to the scene block building.

In an exemplary embodiment, a status editing control is displayed in the virtual world; and the display module 601 is configured to display a status editing interface in response to a trigger operation performed on the status editing control, the status editing interface including a status selection region, and at least one social status being displayed in the status selection region; and the status module 602 is configured to determine the first social status in the at least one social status in response to a social status selection operation.

In an exemplary embodiment, the display module 601 is configured to display a status editing interface corresponding to the first scene block building in response to an operation of triggering the first scene block building, the status editing interface including a status selection region, and at least one social status corresponding to the first scene block building being displayed in the status selection region; and the status module 602 is configured to determine the first social status in the at least one social status corresponding to the first scene block building in response to a social status selection operation.

In an exemplary embodiment, the status module 602 is configured to obtain a program event of the first user account in another application program, the another application program including at least one of an instant messaging program, a social media program, a music program, a local service program, a sport program, an office program, a conferencing program, or a video program; and the status module 602 is configured to determine the first social status of the first user account in the virtual world based on the program event in the another application program.

In an exemplary embodiment, the status module 602 is configured to determine the first social status of the first user account in the virtual world based on a social update posted by the first user account in the instant messaging program or the social media program or the local service program; or determine the first social status of the first user account in the virtual world based on a music playback event of the first user account in the music program; or determine the first social status of the first user account in the virtual world based on sport data of the first user account in the sport program; or determine the first social status of the first user account in the virtual world based on an office event of the first user account in the office program; or determine the first social status of the first user account in the virtual world based on a call status of the first user account in the conferencing program; or determine the first social status of the first user account in the virtual world based on a video playback status of the first user account in the video program.

In an exemplary embodiment, a wearable device is associated with the apparatus; and the status module 602 is configured to determine the first social status of the first user account based on sport data provided by the wearable device, the first social status being one of sport statuses.

In an exemplary embodiment, the status module 602 is configured to determine the first social status of the first user account based on a positioned location indicated by positioning data of the apparatus.

In an exemplary embodiment, the status module 602 is configured to obtain a social plan of the first user account, the social plan being configured for reflecting social statuses of the first user account within different time periods of preset duration; and determine the first social status of the first user account according to current time and the social plan.

In an exemplary embodiment, the display module 601 is configured to recommend a similar user account to the first user account, a social plan of the similar user account matching the social plan of the first user account in n consecutive preset durations, n being a positive integer.

In an exemplary embodiment, when the first social status is studying, the first scene block building includes a classroom, and the activity status corresponding to the first social status includes a studying state; when the first social status is exercising, the first scene block building includes a sports field, and the activity status corresponding to the first social status includes an exercising state; when the first social status is that mercury retrograde is about to retreat, the first scene block building includes a sunlight garden, and the activity status corresponding to the first social status includes a praying state; when the first social status is music listening, the first scene block building includes a sunlight garden, and the activity status corresponding to the first social status includes a music listening state; when the first social status is sleeping, the first scene block building includes a home, and the activity status corresponding to the first social status includes a sleeping state; or when the first social status is gaming, the first scene block building includes an entertainment hall, and the activity status corresponding to the first social status includes a gaming state.

In an exemplary embodiment, the first social status further corresponds to first social information; and the display module 601 is configured to display the first social information in association with the first virtual character in the first scene block building.

In an exemplary embodiment, a second virtual character corresponding to a second user account is further displayed in the first scene block building; and the display module 601 is configured to display, in response to a trigger operation of initiating a chat with the second virtual character, a floating chat window between the first user account and the second user account in the virtual world, the first virtual character and the second virtual character located in the first scene block building being displayed in the virtual world; and the display module 601 is configured to display an interaction action between the first virtual character and the second virtual character in the virtual world according to chat content in the floating chat window.

In an exemplary embodiment, the display module 601 is configured to control, according to a first facial expression transmitted by the first user account in the floating chat window, the first virtual character to perform an action corresponding to the first facial expression; and/or the display module 601 is configured to control, according to a second facial expression transmitted by the second user account in the floating chat window, the second virtual character to perform an action corresponding to the second facial expression; and/or the display module 601 is configured to control, according to an interaction trigger message transmitted in the floating chat window, the first virtual character and the second virtual character to jointly perform the interaction action corresponding to the interaction trigger message.

In an exemplary embodiment, the status module 602 is configured to identify a status reservation message in chat information between the first user account and the second user account, the status reservation message including a reserved social status and reservation time, and the reserved social status being a two-person social status; and the display module 601 is configured to display, at the reservation time corresponding to the status reservation message, the first virtual character corresponding to the first user account and the second virtual character corresponding to the second user account in a reserved scene block building corresponding to the reserved social status, the first virtual character being in a first activity status corresponding to the reserved social status, the second virtual character being in a second activity status corresponding to the reserved social status, and the first virtual character in the first activity status and the second virtual character in the second activity status having an interaction action.

This application further provides a computer device. The computer device includes a processor and a memory, the memory having at least one instruction stored therein, the at least one instruction being loaded and executed by the processor to implement the virtual character display method provided in the foregoing method embodiments. The computer device may be a terminal provided in FIG. 14.

Figure 14:
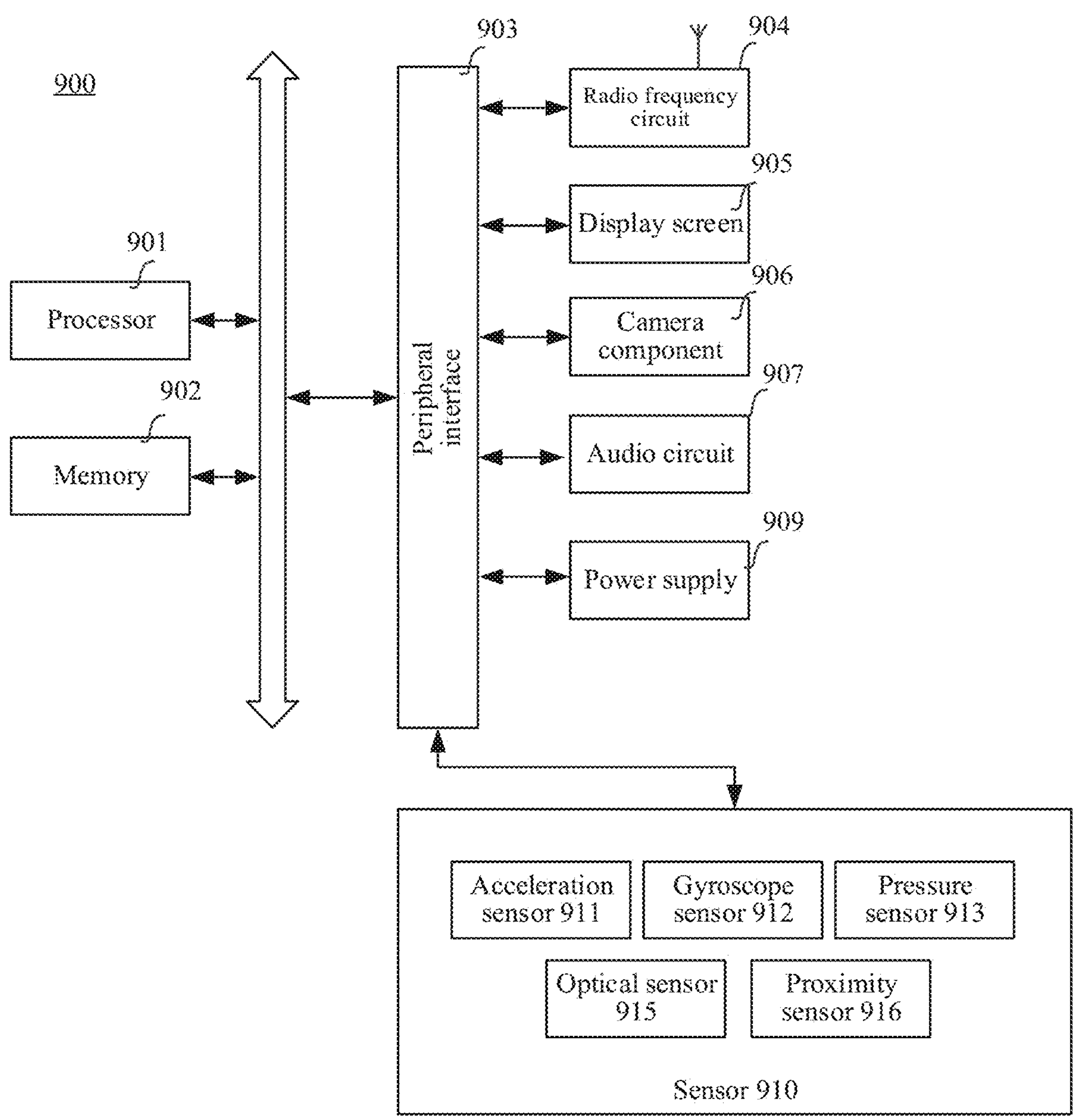
FIG. 14 is a block diagram of a terminal according to an exemplary embodiment of this application.

FIG. 14 is a structural block diagram of a terminal 900 according to an exemplary embodiment of this application. The terminal 900 may be a smartphone, a tablet computer, a moving picture experts group audio layer III (MP3) player, a moving picture experts group audio layer IV (MP4) player, a notebook computer, or a desktop computer. The terminal 900 may also be referred to as another name such as user account device, a portable terminal, a laptop terminal, or a desktop terminal.

Generally, the terminal 900 includes a processor 901 and a memory 902.

The processor 901 may include one or more processing cores, for example, a 4-core processor or an 8-core processor. The processor 901 may be implemented by using at least one hardware form of a digital signal processor (DSP), a field-programmable gate array (FPGA), or a programmable logic array (PLA). The processor 901 may alternatively include a main processor and a coprocessor. The main processor is configured to process data in an active state, also referred to as a central processing unit (CPU). The coprocessor is a low-power consumption processor configured to process data in a standby state. In some embodiments, the processor 901 may be integrated with a graphics processing unit (GPU, namely, a display of a virtual character). The GPU is configured to render and draw content that needs to be displayed on a display. In some embodiments, the processor 901 may further include an artificial intelligence (AI) processor. The AI processor is configured to process computing operations related to machine learning.

The memory 902 may include one or more computer-readable storage media. The computer-readable storage media may be non-transient. The memory 902 may also include a high-speed random access memory, as well as non-volatile memory, such as one or more disk storage devices and flash storage devices. In some embodiments, a non-transitory computer-readable storage medium in the memory 902 is configured to store at least one instruction, the at least one instruction being configured to be executed by the processor 901 to implement the virtual character display method provided in the method embodiments of this application.

In some embodiments, the terminal 900 may also include a peripheral interface 903 and at least one peripheral. The processor 901, the memory 902, and the peripheral interface 903 may be connected by using a bus or a signal cable. Each peripheral may be connected to the peripheral interface 903 by using a bus, a signal cable, or a circuit board. Specifically, the peripheral includes: at least one of a radio frequency circuit 904, a display screen 905, a camera component 906, an audio circuit 907, or a power supply 909.

The peripheral interface 903 may be configured to connect the at least one peripheral related to input/output (I/O) to the processor 901 and the memory 902. In some embodiments, the processor 901, the memory 902, and the peripheral interface 903 are integrated on the same chip or the same circuit board. In some other embodiments, any or both of the processor 901, the memory 902, and the peripheral interface 903 may be implemented on an independent chip or circuit board, which is not limited in the embodiments.

The radio frequency circuit 904 is configured to receive and transmit a radio frequency (RF) signal, which is also referred to as an electromagnetic signal. The radio frequency circuit 904 communicates with a communication network and other communication devices through the electromagnetic signal. The radio frequency circuit 904 converts an electric signal into an electromagnetic signal for transmission, or converts a received electromagnetic signal into an electric signal. For example, the radio frequency circuit 904 includes: an antenna system, an RF transceiver, one or more amplifiers, a tuner, an oscillator, a digital signal processor, a codec chip set, a user account identity module card, and the like. The radio frequency circuit 904 may communicate with other terminals through at least one wireless communication protocol. The wireless communication protocol includes, but is not limited to a world wide web, a metropolitan area network, an intranet, generations of mobile communication networks (2G, 3G, 4G, and 5G), a wireless local area network and/or a wireless fidelity (Wi-Fi) network. In some embodiments, the radio frequency circuit 904 may further include a circuit related to near field communication (NFC), which is not limited in this application.

The display screen 905 is configured to display a user interface (UI). The UI may include a graph, a text, an icon, a video, and any combination thereof. When the display screen 905 is a touch display screen, the display screen 905 also has the ability to collect a touch signal at or above the surface of the display screen 905. The touch signal may be inputted, as a control signal, to the processor 901 for processing. In this case, the display screen 905 may also be configured to provide virtual buttons and/or virtual keyboards, also referred to as soft buttons and/or soft keyboards. In some embodiments, there may be one display screen 905, arranged on a front panel of the terminal 900. In some other embodiments, there may be at least two display screens 905 respectively arranged on different surfaces of the terminal 900 or in a folded design. In still other embodiments, the display screen 905 may be a flexible display screen arranged on a curved or folded surface of the terminal 900. Even further, the display screen 905 may be arranged in a non-rectangular irregular pattern, that is, a special-shaped screen. The display screen 905 may be prepared by using a material such as a liquid crystal display (LCD), an organic light-emitting diode (OLED), or the like.

The camera component 906 is configured to acquire an image or a video. For example, the camera component 906 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any of a main camera, a depth-of-field camera, a wide-angle camera, and a telephoto camera, to achieve background blurring function through fusion of the main camera and the depth-of-field camera, panoramic photographing and virtual reality (VR) photographing through fusion of the main camera and the wide-angle camera, or other fusion photographing functions. In some embodiments, the camera component 906 may further include a flash. The flash may be a single color temperature flash or a double color temperature flash. The double color temperature flash refers to a combination of a warm flash and a cold flash, and may be configured to perform light ray compensation at different color temperatures.

The audio circuit 907 may include a microphone and a speaker. The microphone is configured to acquire sound waves of user accounts and surroundings, and convert the sound waves into electrical signals and input the signals to the processor 901 for processing, or input the signals to the RF circuit 904 to implement voice communication. For the purpose of stereo sound collection or noise reduction, there may be a plurality of microphones, respectively disposed at different parts of the terminal 900. The microphone may be further an array microphone or an omnidirectional collection microphone. The speaker is configured to convert the electrical signal from the processor 901 or the radio frequency circuit 904 into sound waves. The speaker may be a conventional thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 907 may also include an earphone jack.

The power supply 909 is configured to supply power to components in the terminal 900. The power supply 909 may be an alternating current, a direct current, a primary battery, or a rechargeable battery. When the power supply 909 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 900 further includes one or more sensors 910. The one or more sensors 910 include, but are not limited to an acceleration sensor 911, a gyroscope sensor 912, a pressure sensor 913, an optical sensor 915, and a proximity sensor 916.

A person skilled in the art may understand that a structure shown in FIG. 14 constitutes no limitation on the terminal 900, and the terminal may include more or fewer components than those shown in the figure, or combine some components, or use a different component deployment.

The memory further includes one or more programs. The one or more programs are stored in the memory and include operations to be executed by the terminal in the virtual character display method provided in the embodiments of this application.

This application further provides a computer device. The computer device includes a processor and a memory, the memory having at least one program stored therein, the at least one program being loaded and executed by the processor to implement the virtual character display method provided in the foregoing method embodiments.

This application further provides a non-transitory computer-readable storage medium. The storage medium has at least one program stored therein, the at least one program being loaded and executed by a processor to implement the virtual character display method provided in the foregoing method embodiments.

The term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. This application further provides a computer program product or a computer program. The computer program product or the computer program includes computer instructions, the computer instructions being stored in a computer-readable storage medium. A processor of a computer device reads the computer instructions from the computer-readable storage medium, and the processor executes the computer instructions, to cause the computer device to perform the virtual character display method provided in the foregoing implementations.

What is claimed is:

1. A virtual character display method performed by a computer device, the method comprising:

displaying a virtual world, the virtual world comprising at least two scene block buildings, and each of the scene block buildings being configured for displaying virtual characters in activity statuses of a same type;

determining a first social status posted by a user of the computer device associated with a first user account of the virtual world; and displaying a first virtual character corresponding to the first user account in a first scene block building corresponding to the first social status, the first virtual character being in an activity status corresponding to the first social status and having a scene element matching the activity status corresponding to the first scene block building.

2. The method according to claim 1, wherein the method further comprises:

displaying a status editing control in the virtual world;

displaying a status editing interface in response to a trigger operation performed on the status editing control, the status editing interface comprising a status selection region, and at least one social status being displayed in the status selection region; and determining the first social status in the at least one social status in response to a social status selection operation.

3. The method according to claim 1, wherein the determining a first social status posted by a user of the computer device associated with a first user account of the virtual world comprises:

displaying a status editing interface corresponding to the first scene block building in response to an operation of triggering the first scene block building, the status editing interface comprising a status selection region, and at least one social status corresponding to the first scene block building being displayed in the status selection region; and determining the first social status in the at least one social status corresponding to the first scene block building in response to a social status selection operation.

4. The method according to claim 1, wherein the determining a first social status posted by a user of the computer device associated with a first user account of the virtual world comprises:

obtaining a program event of the first user account in another application program, the another application program comprising at least one of an instant messaging program, a social media program, a music program, a local service program, a sport program, an office program, a conferencing program, or a video program; and determining the first social status of the first user account in the virtual world based on the program event in the another application program.

5. The method according to claim 1, wherein the determining a first social status posted by a user of the computer device associated with a first user account of the virtual world comprises:

determining the first social status of the first user account based on a positioned location indicated by positioning data of a terminal in which the client is located.

6. The method according to claim 1, wherein the method further comprises:

obtaining a social plan of the first user account, the social plan being configured for reflecting social statuses of the first user account within different time periods of preset duration; and the determining a first social status posted by a first user account comprises:

determining the first social status of the first user account according to current time and the social plan.

7. The method according to claim 1, wherein when the first social status is studying, the first scene block building comprises a classroom, and the activity status corresponding to the first social status comprises a studying state;

when the first social status is exercising, the first scene block building comprises a sports field, and the activity status corresponding to the first social status comprises an exercising state;

when the first social status is that mercury retrograde is about to retreat, the first scene block building comprises a sunlight garden, and the activity status corresponding to the first social status comprises a praying state;

when the first social status is music listening, the first scene block building comprises a sunlight garden, and the activity status corresponding to the first social status comprises a music listening state;

when the first social status is sleeping, the first scene block building comprises a home, and the activity status corresponding to the first social status comprises a sleeping state; or when the first social status is gaming, the first scene block building comprises an entertainment hall, and the activity status corresponding to the first social status comprises a gaming state.

8. The method according to claim 1, wherein the first social status further corresponds to first social information; and the method further comprises:

displaying the first social information in association with the first virtual character in the first scene block building.

9. The method according to claim 1, wherein a second virtual character corresponding to a second user account is further displayed in the first scene block building; and the method further comprises:

displaying, in response to a trigger operation of initiating a chat with the second virtual character, a floating chat window between the first user account and the second user account in the virtual world, the first virtual character and the second virtual character located in the first scene block building being displayed in the virtual world; and displaying an interaction action between the first virtual character and the second virtual character in the virtual world according to chat content in the floating chat window.

10. The method according to claim 1, further comprising:

identifying a status reservation message in chat information between the first user account and the second user account, the status reservation message comprising a reserved social status and reservation time, and the reserved social status being a two-person social status; and displaying, at the reservation time corresponding to the status reservation message, the first virtual character corresponding to the first user account and the second virtual character corresponding to the second user account in a reserved scene block building corresponding to the reserved social status, the first virtual character being in a first activity status corresponding to the reserved social status, the second virtual character being in a second activity status corresponding to the reserved social status, and the first virtual character in the first activity status and the second virtual character in the second activity status having an interaction action.

11. A computer device, comprising a processor and a memory, the memory having at least one program stored therein, the at least one program, when loaded and executed by the processor, causing the computer device to implement a virtual character display method including:

displaying a virtual world, the virtual world comprising at least two scene block buildings, and each of the scene block buildings being configured for displaying virtual characters in activity statuses of a same type;

determining a first social status posted by a user of the computer device associated with a first user account of the virtual world; and displaying a first virtual character corresponding to the first user account in a first scene block building corresponding to the first social status, the first virtual character being in an activity status corresponding to the first social status and having a scene element matching the activity status corresponding to the first scene block building.

12. The computer device according to claim 11, wherein the method further comprises:

displaying a status editing control in the virtual world;

displaying a status editing interface in response to a trigger operation performed on the status editing control, the status editing interface comprising a status selection region, and at least one social status being displayed in the status selection region; and determining the first social status in the at least one social status in response to a social status selection operation.

13. The computer device according to claim 11, wherein the determining a first social status posted by a user of the computer device associated with a first user account of the virtual world comprises:

displaying a status editing interface corresponding to the first scene block building in response to an operation of triggering the first scene block building, the status editing interface comprising a status selection region, and at least one social status corresponding to the first scene block building being displayed in the status selection region; and determining the first social status in the at least one social status corresponding to the first scene block building in response to a social status selection operation.

14. The computer device according to claim 11, wherein the determining a first social status posted by a user of the computer device associated with a first user account of the virtual world comprises:

obtaining a program event of the first user account in another application program, the another application program comprising at least one of an instant messaging program, a social media program, a music program, a local service program, a sport program, an office program, a conferencing program, or a video program; and determining the first social status of the first user account in the virtual world based on the program event in the another application program.

15. The computer device according to claim 11, wherein the determining a first social status posted by a user of the computer device associated with a first user account of the virtual world comprises:

determining the first social status of the first user account based on a positioned location indicated by positioning data of a terminal in which the client is located.

16. The computer device according to claim 11, wherein the method further comprises:

obtaining a social plan of the first user account, the social plan being configured for reflecting social statuses of the first user account within different time periods of preset duration; and the determining a first social status posted by a first user account comprises:

determining the first social status of the first user account according to current time and the social plan.

17. The computer device according to claim 11, wherein when the first social status is studying, the first scene block building comprises a classroom, and the activity status corresponding to the first social status comprises a studying state;

when the first social status is exercising, the first scene block building comprises a sports field, and the activity status corresponding to the first social status comprises an exercising state;

when the first social status is that mercury retrograde is about to retreat, the first scene block building comprises a sunlight garden, and the activity status corresponding to the first social status comprises a praying state;

when the first social status is music listening, the first scene block building comprises a sunlight garden, and the activity status corresponding to the first social status comprises a music listening state;

when the first social status is sleeping, the first scene block building comprises a home, and the activity status corresponding to the first social status comprises a sleeping state; or when the first social status is gaming, the first scene block building comprises an entertainment hall, and the activity status corresponding to the first social status comprises a gaming state.

18. The computer device according to claim 11, wherein a second virtual character corresponding to a second user account is further displayed in the first scene block building; and the method further comprises:

displaying, in response to a trigger operation of initiating a chat with the second virtual character, a floating chat window between the first user account and the second user account in the virtual world, the first virtual character and the second virtual character located in the first scene block building being displayed in the virtual world; and displaying an interaction action between the first virtual character and the second virtual character in the virtual world according to chat content in the floating chat window.

19. The computer device according to claim 11, wherein the method further comprises:

identifying a status reservation message in chat information between the first user account and the second user account, the status reservation message comprising a reserved social status and reservation time, and the reserved social status being a two-person social status; and displaying, at the reservation time corresponding to the status reservation message, the first virtual character corresponding to the first user account and the second virtual character corresponding to the second user account in a reserved scene block building corresponding to the reserved social status, the first virtual character being in a first activity status corresponding to the reserved social status, the second virtual character being in a second activity status corresponding to the reserved social status, and the first virtual character in the first activity status and the second virtual character in the second activity status having an interaction action.

20. A non-transitory computer-readable storage medium, having at least one program stored therein, the at least one program, when loaded and executed by a processor of a computer device, causing the computer device to implement a virtual character display method including:

displaying a virtual world, the virtual world comprising at least two scene block buildings, and each of the scene block buildings being configured for displaying virtual characters in activity statuses of a same type;

determining a first social status posted by a user of the computer device associated with a first user account of the virtual world; and displaying a first virtual character corresponding to the first user account in a first scene block building corresponding to the first social status, the first virtual character being in an activity status corresponding to the first social status and having a scene element matching the activity status corresponding to the first scene block building.

* * * * *